United States Patent
Prokhorov

(10) Patent No.: US 11,021,228 B2
(45) Date of Patent: Jun. 1, 2021

(54) MORPHING AIRFOIL SYSTEM

(71) Applicant: Toyota Motor Engineering & Manufacturing North America, Inc., Plano, TX (US)

(72) Inventor: Danil V. Prokhorov, Canton, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 208 days.

(21) Appl. No.: 16/273,822

(22) Filed: Feb. 12, 2019

(65) Prior Publication Data
US 2020/0255117 A1    Aug. 13, 2020

(51) Int. Cl.
| B64C 3/44 | (2006.01) |
| B64C 3/48 | (2006.01) |
| B64C 3/14 | (2006.01) |
| B64C 13/16 | (2006.01) |

(52) U.S. Cl.
CPC .......... B64C 3/44 (2013.01); B64C 3/14 (2013.01); B64C 3/48 (2013.01); B64C 13/16 (2013.01); *B64C 2003/142* (2013.01); *B64C 2003/445* (2013.01)

(58) Field of Classification Search
CPC .... B64C 3/44; B64C 3/14; B64C 3/48; B64C 13/16; B64C 2003/445; B64C 2003/142
See application file for complete search history.

(56) References Cited

U.S. PATENT DOCUMENTS

| 1,785,300 | A | * | 12/1930 | De La Tour Castelcicala ............ B64C 23/08 244/21 |
| 3,622,108 | A |   | 11/1971 | Mathewson |
| 4,285,482 | A |   | 8/1981  | Lewis |
| 5,590,854 | A | * | 1/1997  | Shatz ...................... B64C 3/141 244/206 |
| 6,015,115 | A | * | 1/2000  | Dorsett ..................... B64C 3/46 244/123.11 |
| 6,347,769 | B1 | * | 2/2002 | To ............................ B63B 1/248 244/219 |
| 6,622,973 | B2 | * | 9/2003 | Al-Garni ............... B64C 21/025 244/206 |

(Continued)

FOREIGN PATENT DOCUMENTS

| WO | WO1996014242 A1 | 5/1996 |
| WO | WO2013066439 A1 | 5/2013 |

*Primary Examiner* — Philip J Bonzell
*Assistant Examiner* — Tye William Abell
(74) *Attorney, Agent, or Firm* — Christopher G. Darrow; Darrow Mustafa PC

(57) ABSTRACT

A morphing airfoil system includes an airfoil having a bulkhead structured to form a leading edge of the airfoil. A first spool is rotatably coupled to the bulkhead, and a second spool is rotatably coupled to the bulkhead opposite the first spool. An airfoil skin has a first end secured to the first spool, a second end secured to the second spool, and a portion extending between the first and second spools to form an exterior surface of the airfoil. The airfoil skin is structured to be windable around the first and second spools such that a configuration of the airfoil is controllable by rotating at least one of the first spool and the second spool so as to wind a portion of the airfoil skin around, or unwind a portion of the airfoil skin from, the at least one of the first spool and the second spool.

10 Claims, 11 Drawing Sheets

(56) References Cited

U.S. PATENT DOCUMENTS

| | | | |
|---|---|---|---|
| 7,178,760 B2* | 2/2007 | Bernard | B64D 15/16 244/134 A |
| 8,469,313 B2 | 6/2013 | Dong | |
| 9,394,046 B2* | 7/2016 | Garver | B64C 3/50 |
| 9,856,013 B2 | 1/2018 | Paris Carballo et al. | |
| 9,944,356 B1* | 4/2018 | Wigley | B64C 3/50 |
| 9,988,141 B2* | 6/2018 | Garver | B64C 23/06 |
| 10,468,545 B1* | 11/2019 | Yang | B64C 3/48 |
| 2015/0298792 A1* | 10/2015 | Paris Carballo | B64C 3/38 244/45 R |

* cited by examiner

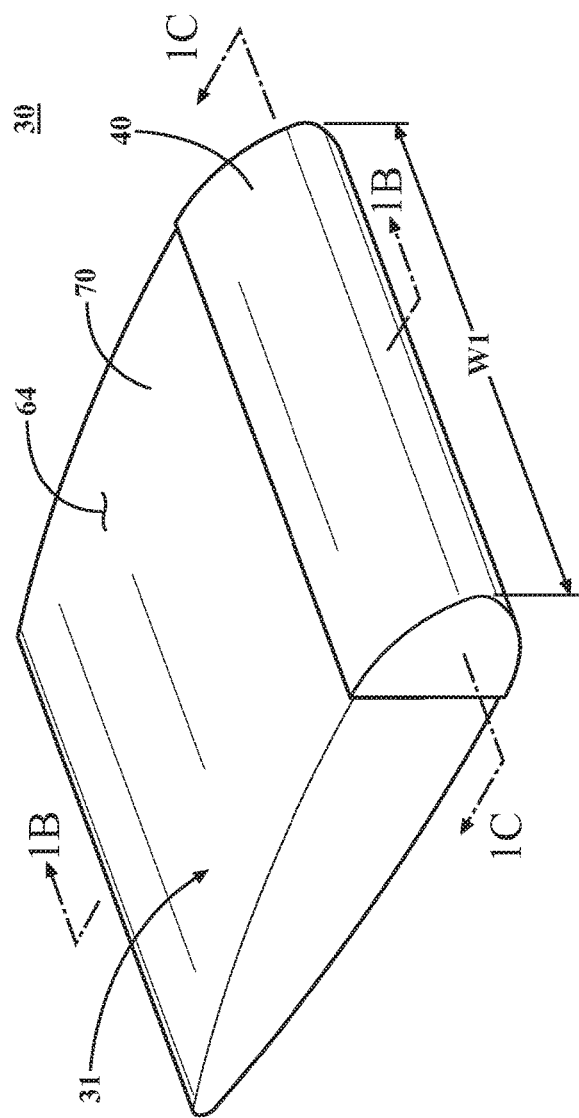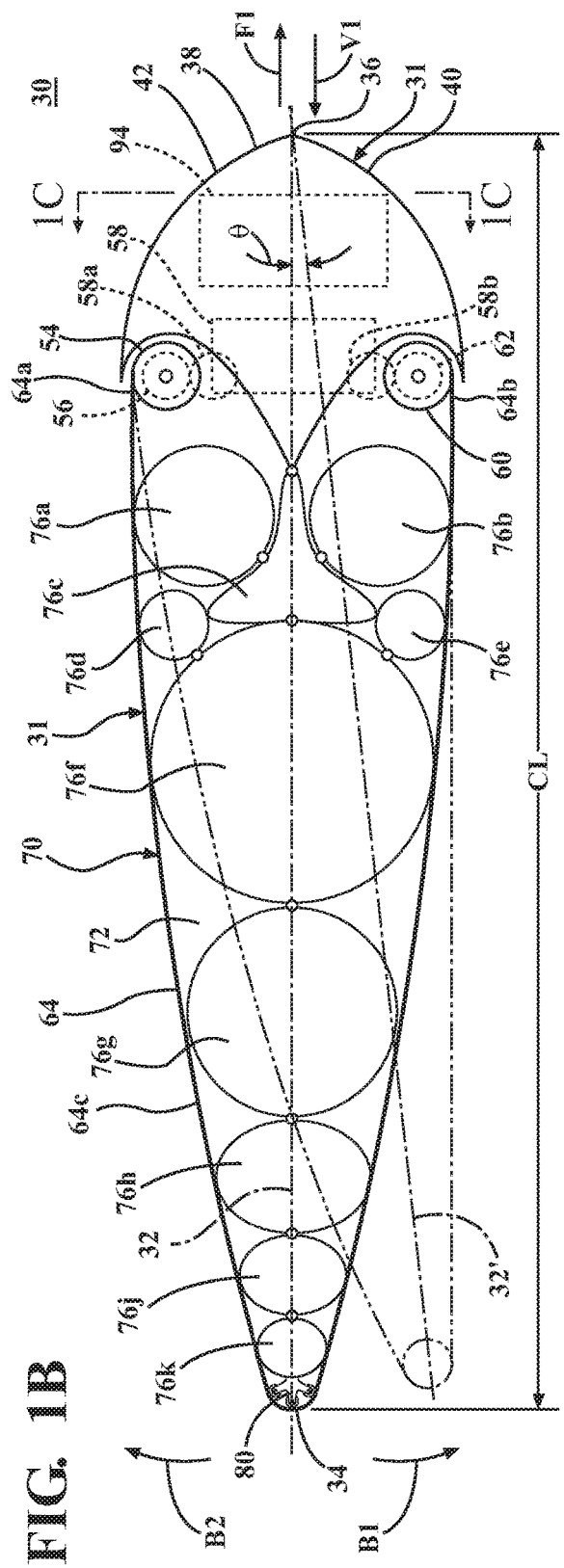
FIG. 1A
FIG. 1B

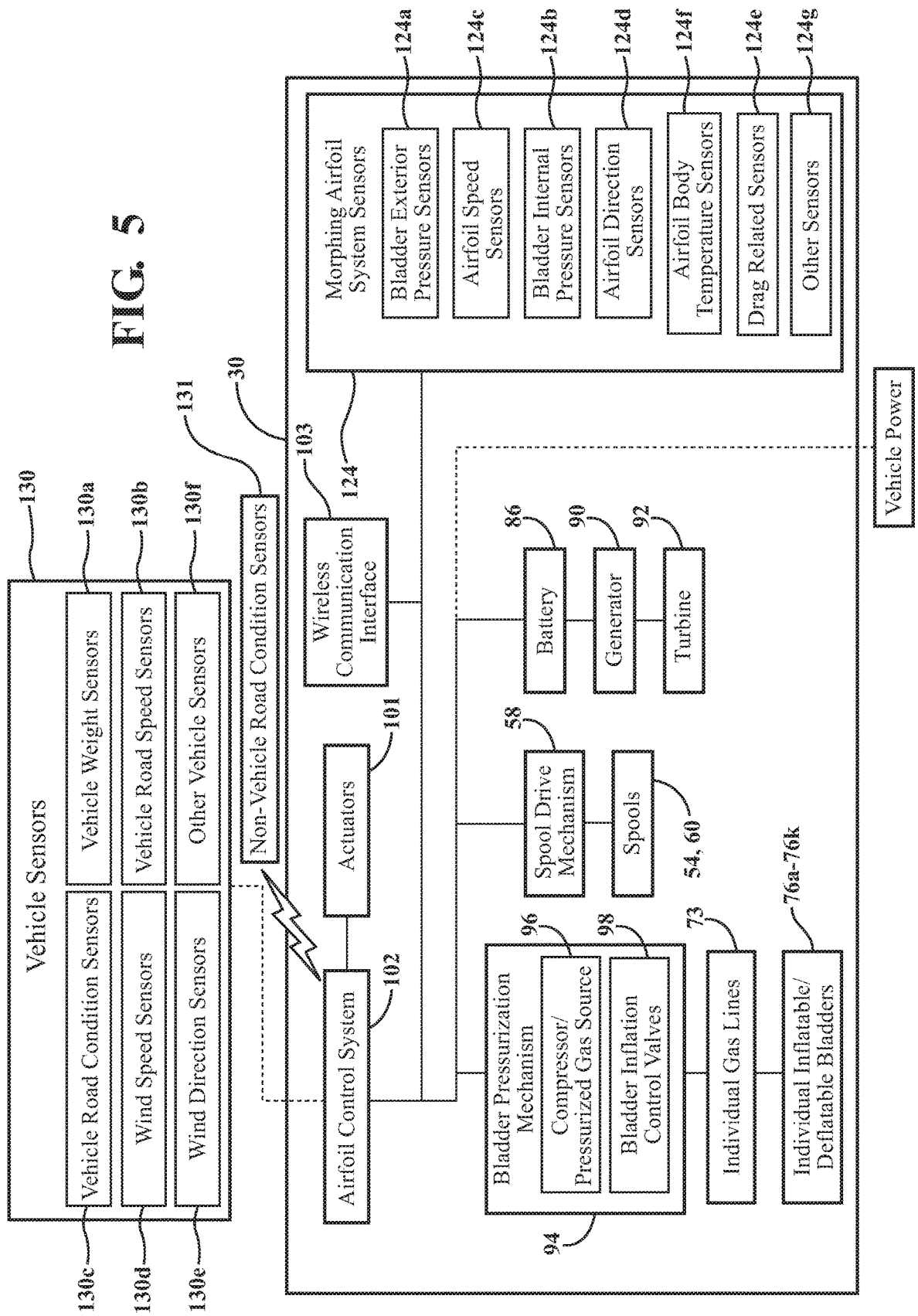

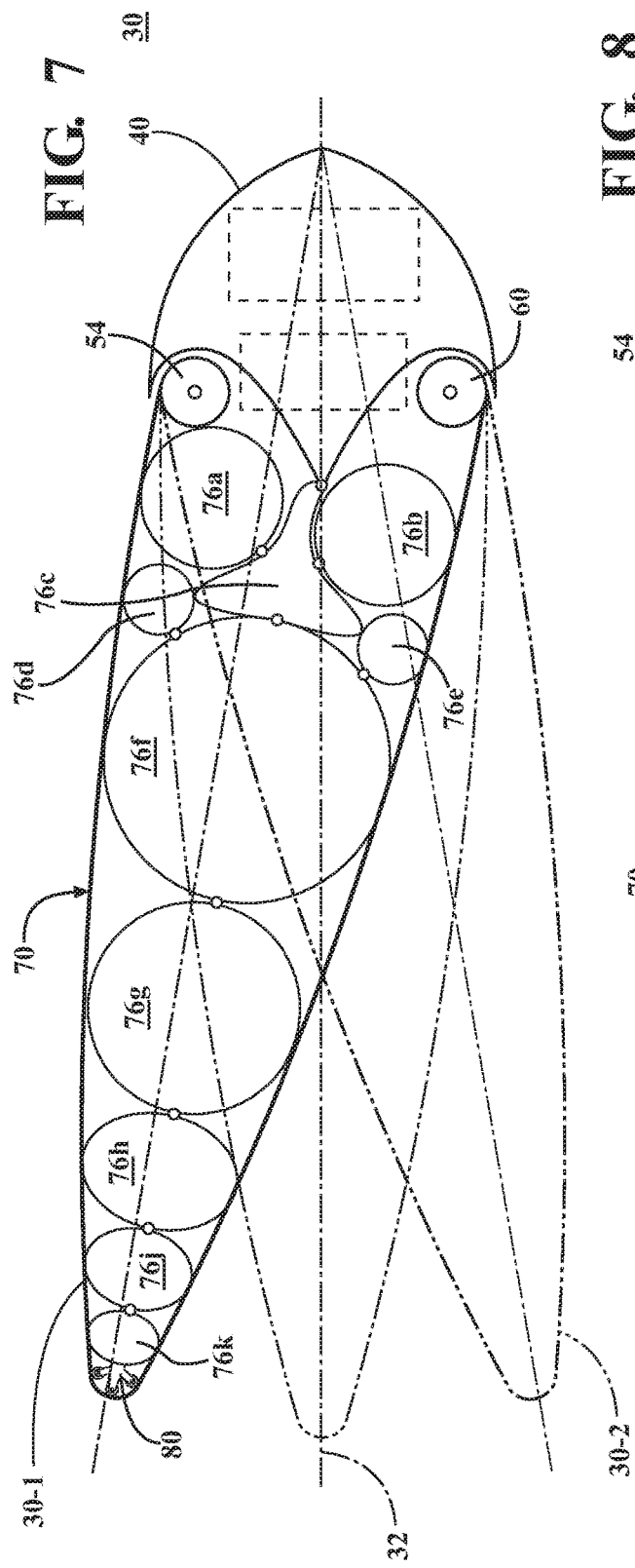
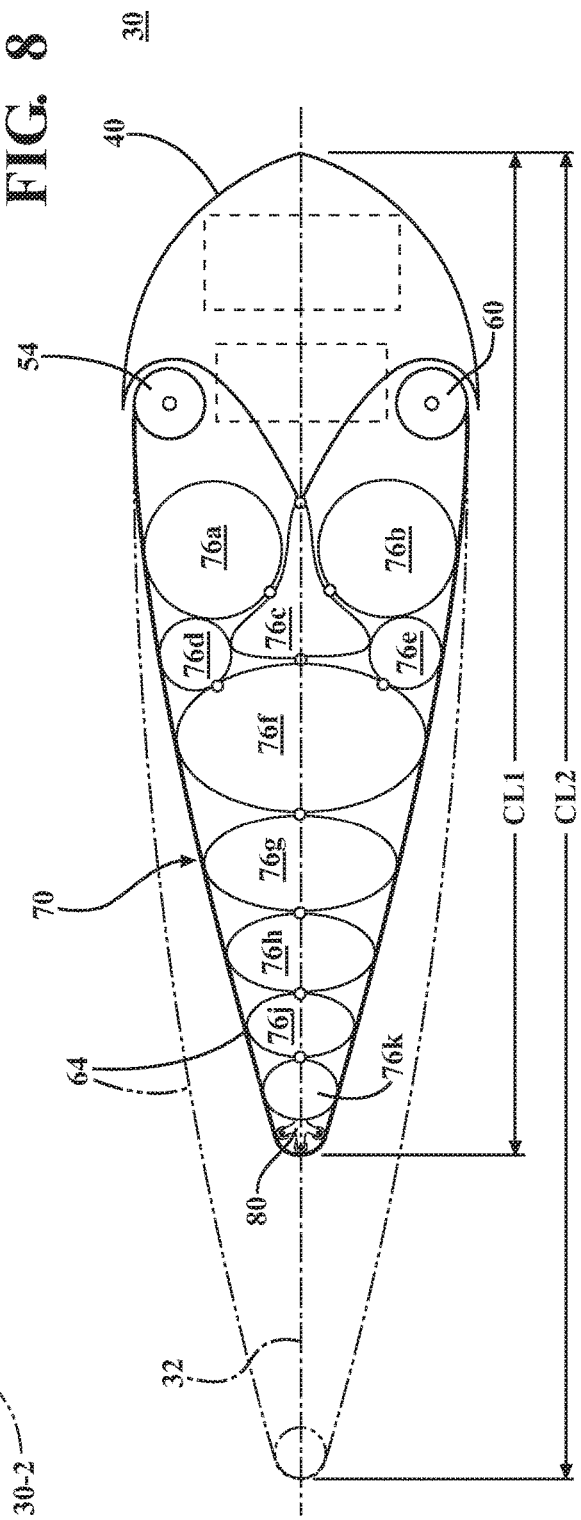

MORPHING AIRFOIL SYSTEM

TECHNICAL FIELD

The subject matter described herein relates, in general, to airfoils and, more particularly, to airfoils having a geometry or configuration which is morphable or adjustable during use.

BACKGROUND

Airfoils may be used in aircraft to provide lift, and may be incorporated into ground vehicles to favorably modify the airflow around the vehicle when moving. However, aspects of airfoils which are beneficial to vehicle performance under certain conditions may be detrimental to vehicle performance under other conditions. Also, designing an airfoil to maximize a specific performance parameter may be detrimental to other, possibly secondary performance parameters.

SUMMARY

In one aspect of the embodiments described herein, a morphing airfoil system is provided. The airfoil system includes an airfoil having a bulkhead structured to form a leading edge of the airfoil. A first spool is rotatably coupled to the bulkhead, and a second spool is rotatably coupled to the bulkhead opposite the first spool. An airfoil skin has a first end secured to the first spool, a second end secured to the second spool, and a portion extending between the first and second spools to form an exterior surface of the airfoil. The airfoil skin is structured to be windable around the first and second spools such that a configuration of the airfoil is controllable by rotating at least one of the first spool and the second spool so as to wind a portion of the airfoil skin around, or unwind a portion of the airfoil skin from, the at least one of the first spool and the second spool.

In another aspect of the embodiments described herein, a morphing airfoil system is provided. The system includes an airfoil including a bulkhead and an airfoil body extending from the bulkhead. A pair of rotatable spools is operably coupled to the bulkhead. The airfoil body is operably coupled to the pair of rotatable spools so as to enable a configuration of the airfoil to be changed by rotation of at least one spool of the pair of rotatable spools. A spool drive mechanism is configured to rotate each spool of the pair of rotatable spools. One or more processors are provided, and a memory is communicably coupled to the one or more processors. The memory stores an airfoil control module including instructions that when executed by the one or more processors cause the one or more processors to operate the spool drive mechanism to rotate at least one spool of the pair of rotatable spools so as to change the configuration of the airfoil.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1A is a front perspective view of a morphing airfoil system in accordance with an embodiment of the present invention.

FIG. 1B is a schematic side cross-sectional view of the morphing airfoil system shown in FIG. 1A.

FIG. 5 is a schematic block diagram of the morphing airfoil system shown in FIG. 1A.

FIG. 7 is a schematic side cross-sectional view of the morphing airfoil system shown in FIG. 1A, illustrating control of the airfoil skin to affect an angle of the airfoil.

FIG. 8 is a schematic side cross-sectional view of the morphing airfoil system shown in FIG. 1A, illustrating control of the airfoil skin and bladder inflation to affect a chord length of the airfoil.

DETAILED DESCRIPTION

Embodiments of a morphing airfoil system are disclosed herein. The airfoil system includes an airfoil having a bulkhead structured to form a leading edge of the airfoil. A first spool is rotatably coupled to the bulkhead, and a second spool is rotatably coupled to the bulkhead opposite the first spool. An airfoil skin has a first end secured to the first spool, a second end secured to the second spool, and a portion extending between the first and second spools to form an exterior surface of the airfoil. The airfoil skin is structured to be windable around the first and second spools such that a configuration of the airfoil is controllable by rotating at least one of the first spool and the second spool so as to wind a portion of the airfoil skin around, or unwind a portion of the airfoil skin from, the at least one of the first spool and the second spool. The airfoil system also includes one or more individually operable inflatable/deflatable bladders enclosed within the airfoil skin. The configuration of the airfoil is also controllable by controlling inflation and deflation of the bladders. An angle and a length of the airfoil may be controlled by manual or autonomous commands, to optimize vehicle performance parameters which may be affected by airfoil configuration.

For the purposes described herein, an "airfoil" is defined as a structure configured to control or modify a flow of air around the structure so as to achieve a specific effect or purpose. In one or more arrangements, the airfoil may be in the form of a wing designed to control the lift provided to the airfoil and a structure (for example, a ground vehicle or an aircraft fuselage) attached to the wing. In one or more arrangements, the airfoil may be utilized as a spoiler designed to decrease or minimize turbulence or drag, or to otherwise modify a flow of air over a moving ground vehicle. The airfoil may also have other applications.

A vehicle to which the morphing airfoil is attached may be a ground vehicle (i.e., automobile), an aircraft, or another type of vehicle. The term "lift" refers to an upward reaction force acting on the airfoil, produced by an airflow impinging on the airfoil and flowing over the surfaces of the airfoil. The forces acting on the airfoil may be transferred to the vehicle attached to the airfoil, via the airfoil. A "morphing" airfoil is an airfoil whose cross-sectional configuration may be controlled to some extent, either manually or autonomously (for example, by one or more processors and suitable actuators), to change the aerodynamic characteristics of the airfoil when the airfoil is in use (for example, when the vehicle to which the airfoil is attached is in motion). "Morphing" of the airfoil refers to changing the configuration of the airfoil as described herein.

Figure 9:
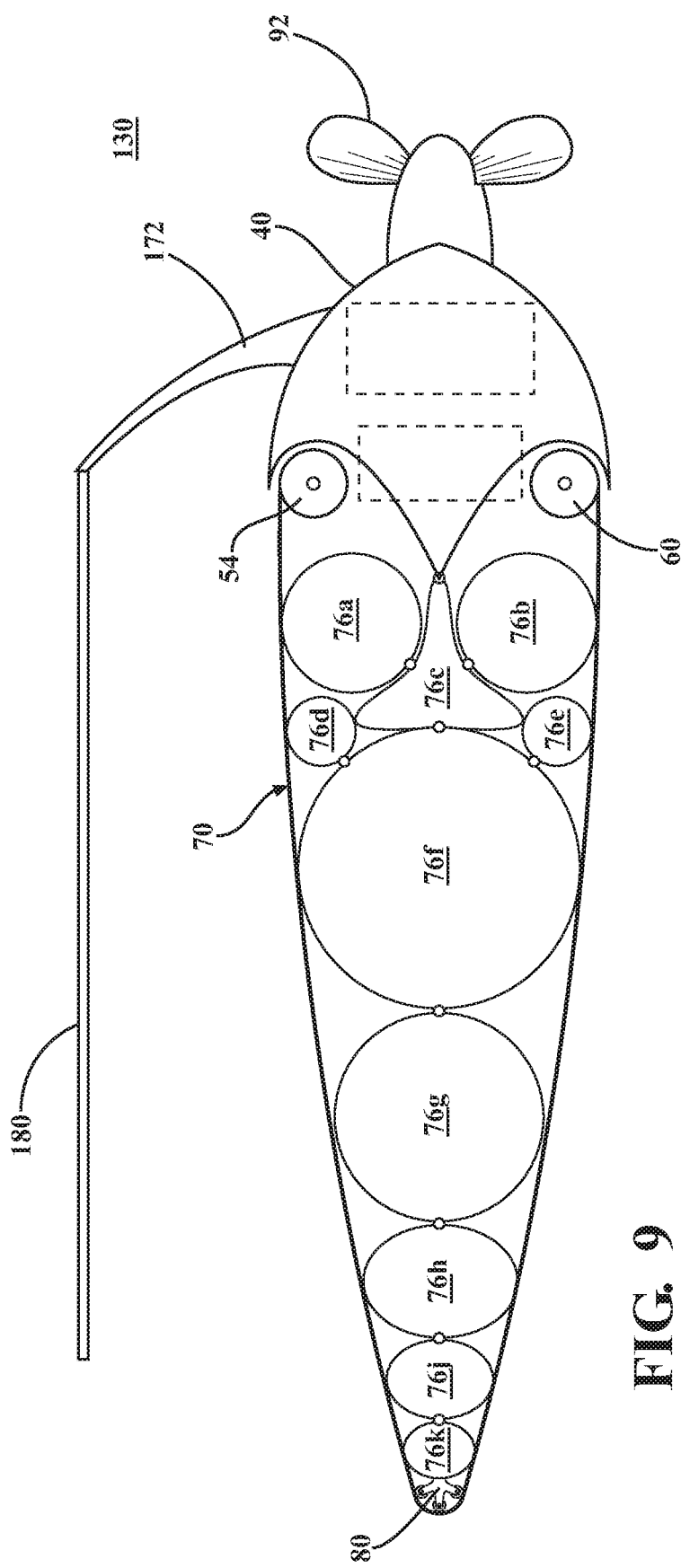
FIG. 9 is a schematic side cross-sectional view of a morphing airfoil system in accordance with another embodiment described herein.

As used herein, the terms "morphing airfoil" and "airfoil" include elements having outer or exterior surfaces directly exposed to an air flow impinging on the airfoil. This includes at least the bulkhead 40 and the airfoil skin 64 as described herein. The terms "airfoil system" and "morphing airfoil system" encompass the bulkhead 40, the outer skin 64, and also the elements contained inside the outer skin 64 and bulkhead 40 as described herein, such as the inflatable/deflatable bladders 76a-76k which help control the overall shape of the airfoil body, the spools 54 and 60, the spool drive mechanism 58, etc. In an embodiment such as shown in FIG. 9 which incorporates a pylon 172 and optionally attachable solar panel 180, the airfoil system may also include these elements.

FIG. 1A is a schematic front perspective view of a morphing airfoil system 30 including a morphing airfoil 31, in accordance with an embodiment of the present invention. FIG. 1B is a schematic cross-sectional side view of the morphing airfoil system 30 shown in FIG. 1A. Referring to FIG. 1B, as used herein, the terms "chord" and "chord line" refer to an imaginary line 32 connecting a trailing edge 34 of the airfoil 31 and a forward-most surface 36 of a leading edge 38 of the airfoil 31. Chord 32 may have a chord length CL. The terms "chord length" and "airfoil length" will be used herein interchangeably. The chord length may be measured using suitable sensors configured for detecting or calculating the distance between, example, the leading edge 38 and the trailing edge 34.

In addition, an angle of the airfoil is an angle θ formed between the chord line 32 and a vector F1 representing the direction of relative motion of the airfoil with respect to the atmosphere through which the airfoil 31 is moving. For example, as seen in FIG. 1B, for an airfoil incorporated into a ground vehicle and moving in a direction parallel to a flat, horizontal road surface, and with an airfoil chord 32 extending horizontally, the airfoil angle θ may have a value of essentially zero degrees. If the chord orientation is changed from the horizontal orientation to the orientation 32' shown in FIG. 1B, the airfoil angle θ may have a non-zero value as shown. Vector V1 in FIG. 1B represents the direction of an impinging airflow on the airfoil system 30. In addition, a "configuration" of the airfoil includes a size, shape, and/or angle of the airfoil. Thus, for example, the configuration of the airfoil system 30 or the airfoil 31 may be changed by controlling elements of the airfoil system 30 to vary aspects such as the chord length CL, angle θ, and thickness T (FIG. 2) of the airfoil. The terms "chord angle" and "airfoil angle" will be used herein interchangeably. The airfoil angle θ may be calculated or otherwise determined using any suitable method. For example, the airfoil angle θ may be calculated using sensor information, with a known reference location in space of the leading edge 38 and a measured location in space of the trailing edge 34 with respect to a horizontal reference plane along which the chord may extend when the airfoil angle is at 0°.

Figure 2:
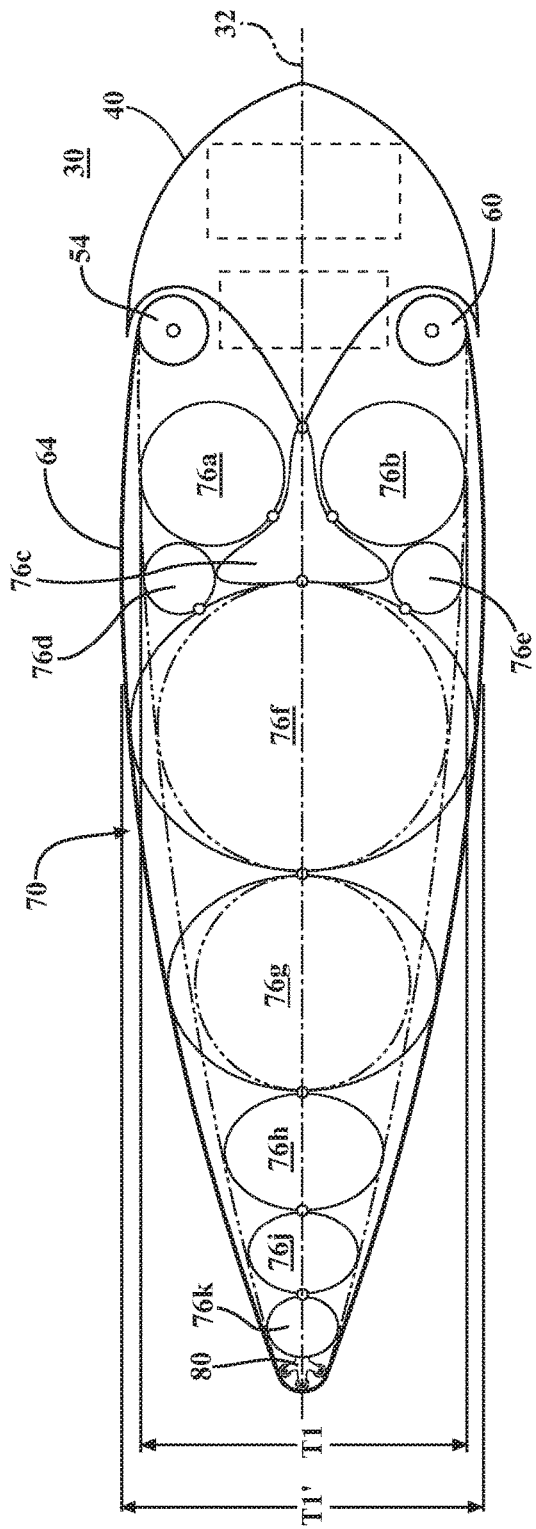
FIG. 2 is a schematic side cross-sectional view of the morphing airfoil system shown in FIG. 1A, illustrating control of bladder inflation to modify the thickness of the airfoil body.

Referring to FIG. 2, the thickness T of the airfoil may be defined as a portion of the airfoil body 70 having the largest dimension in a direction perpendicular to the airfoil chord 32. In one or more arrangements described herein, the thickness of the airfoil may be changed to control the aerodynamic properties of the airfoil 31. for example, as shown in FIG. 2, the airfoil thickness T may be changed from a relatively smaller value T1 to a relatively larger value T1', or vice versa.

Referring again to FIGS. 1A-1D, airfoil system 30 may include a hollow bulkhead 40 having a width W1 and a curved wall 42 extending along the width W1 and structured to form the leading edge 38 of the airfoil system 30. Wall 42 defines an interior cavity 44 (shown in greater detail in FIGS. 1C, 1D) of the bulkhead. The cavity 44 may house various elements usable for operation of the airfoil system 30. For example, a spool drive mechanism 58 and elements (such as a compressor or pressurized gas source and/or bladder inflation control valves 98) of a bladder pressurization mechanism 94 may be located within the bulkhead cavity 44. Various control lines, power lines, and air/gas supply lines may also be routed through the bulkhead cavity 44.

A first spool 54 may be rotatably mounted on bearings supported by a shaft attached to the bulkhead 40. First spool 54 may be mounted so as to extend parallel to the width dimension W1 of the bulkhead 40. The first spool 54 may be mounted behind the airfoil leading edge 38 formed by the bulkhead 40 and may be positioned so as not to obstruct air flowing over and past the bulkhead leading edge 38. A motion transfer element 56 (such as a gear or pulley, for example) may be mounted on an end of the first spool 54 to enable the spool to be rotated by a spool drive mechanism 58 (described in greater detail below).

A second spool 60 may also mounted to the bulkhead 40 opposite the first spool 54. The second spool 60 may be rotatably mounted on bearings supported by a shaft attached to the bulkhead 40. The second spool 60 may be mounted behind the airfoil leading edge 38 formed by the bulkhead 40 and may be positioned so as not to obstruct air flowing over and past the bulkhead leading edge 38. A motion transfer element 62 (such as a gear or pulley, for example) may be mounted on an end of the second spool 60 to enable the spool to be rotated by the spool drive mechanism 58.

An airfoil skin 64 may have a first end 64a secured to the first spool 54, a second end 64b secured to the second spool 60, and a portion 64c extending between the first and second spools 54, 60 to form an exterior surface of an airfoil body (generally designated 70). The portion 64c of the airfoil skin 64 extending between the first and second spools 54, 60 may extend rearwardly of the bulkhead 40 and spools 54, 60 to form a cavity 72 of the airfoil body. The cavity 72 may contain inflatable bladders, gas lines (collectively designated 73) enabling pressurized gas to be fed to (and vented from) the inflatable bladders, and other elements of the airfoil system 30.

The airfoil skin 64 may be structured to be windable around (and unwindable from) the first and second spools 54, 60 so as to enable a configuration of the airfoil system 30 to be controlled by rotating at least one of the first spool 54 and the second spool 60 so as to wind an associated portion of the airfoil skin 64 around, or unwind an associated portion of the airfoil skin 64 from, the at least one of the first spool 54 and the second spool 60. "Winding" of a portion of the airfoil skin 64 around a spool is defined as rotating the spool in a direction so as to increase a total length of the portion of the airfoil skin 64 that is wrapped or wound around the spool. "Unwinding" of a portion of the airfoil skin 64 from a spool is defined as rotating the spool in a direction so as to decrease a total length of the portion of the airfoil skin 64 that is wrapped or wound around the spool. The airfoil skin 64 may be formed from a material having a relatively smooth surface, that is relatively resistant to puncture, is lightweight, and is flexible (i.e., bendable), but not stretchable. Suitable materials may include metallized plastic films (such as a Mylar® film), metal foils, and other materials.

At least one longitudinal inflatable/deflatable bladder 76 may be positioned within the airfoil body cavity 72. The embodiment shown in FIG. 1B shows a plurality of bladders 76a-76k positioned within the airfoil body cavity 72. Bladders 76a-76k may extend generally parallel with the width dimension W1 of the bulkhead 40. Adjacent ones of the bladders 76a-76k in contact with each other may be physically connected to each other (for example, by stitching, adhesive application, or any other suitable method) along their regions of contact. These connections may aid in maintaining the spatial relationship between the bladders during changes in airfoil configuration.

The sizes (i.e., the gas-fillable internal volumes) of the bladders 76a-76k may vary according to such factors as the desired shapes which the airfoil is designed to achieve during operation, the desired level of control over the inflation characteristics of the airfoil, and other pertinent factors. For example, inflation or deflation of a relatively smaller bladder (such as 76j) may enable a more incremental and precise degree of control over the chord length, angle, or other configuration characteristic of the airfoil 31 than could be provided by inflation/deflation of a relatively larger bladder (such as bladder 76f. A relatively larger bladder may be inflated to a larger volume than a relatively smaller bladder inflated to the same internal pressure. The relatively larger bladder may then contain a larger amount of pressurized gas than the relatively smaller bladder when each bladder is inflated to the same pressure. The bladders 76a-76k may be structured to be fillable with any of a variety of gases or mixtures of gases. Bladders may be filled with (and structured to retain) air, helium, and/or other gases according to the requirements of particular applications. Each bladder may be individually inflatable and deflatable using one or more dedicated, associated gas lines connecting the bladder with an associated bladder inflation control valve.

The bladders 76a-76k may be formed from a material (or materials) which is non-porous, which has a relatively smooth surface, that is relatively resistant to puncture, is lightweight, is flexible (i.e., bendable), and stretchable. The materials from which the bladders 76a-76k and the airfoil skin 64 are formed may be specified so as to minimize friction and prevent "sticking" between the bladders 76a-76k and the airfoil skin 64 during expansion/contraction of the bladders during inflation/deflation, and during winding and unwinding of the airfoil skin. In one or more arrangements, a coating may be applied to one or more of the airfoil skin 64 and the exteriors of the bladders 76a-76k to promote sliding of the airfoil skin and bladders relative to each other.

In addition, the sizes and spatial arrangement of the bladders 76a-76k may be specified to aid in maintaining the general shape of the airfoil body and to aid in incrementally controlling aspects of the airfoil configuration, such as chord length and angle. For example, as seen in FIG. 1B, relatively smaller bladders 76d, 76e may be arranged to form a pocket into which a portion of a relatively larger bladder 76f is received, thereby stabilizing the relative position of the larger bladder 76f. In another example, the internal pressures in relatively smaller bladders 76b and 76e along one side of the airfoil system 30 may be decreased in combination with increased winding of a portion of the airfoil skin around second spool 60 and unwinding of another portion of the airfoil skin from first spool 54 to adjust the airfoil angle θ in direction B1. In a similar procedure, the internal pressures in relatively smaller bladders 76a and 76d along the opposite side of the airfoil system 30 may be decreased in combination with increased winding of a portion of the airfoil skin around first spool 54 and unwinding of another portion of the airfoil skin from second spool 60 to adjust the airfoil angle θ in direction B2 opposite B1. In yet another example, internal pressures in relatively smaller bladders 76a-76e and/or 76h, 76j, 76k may be decreased in combination with increased winding of the airfoil skin around the first and second spools 54, 60 to reduce the length of chord 32, while internal pressure in these relatively smaller bladders may be increased in combination with unwinding of the airfoil skin around the first and second spools 54, 60 to increase the chord length CL. Also, deflation and inflation of the relatively larger bladders such as bladder 76f or bladder 76g may be used to effect a relatively greater decrease or increase of the chord length CL.

Figure 3:
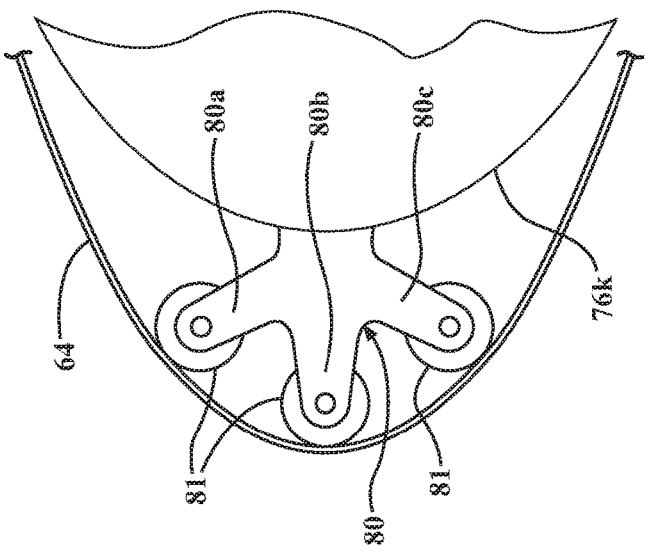
FIG. 3 is a schematic magnified side cross-sectional view of a trailing edge of the morphing airfoil system shown in FIG. 1A.

Referring to FIGS. 1B and 3, a rear-most portion of a rear-most one 76k of the bladders 76a-76k may have one or more roller assemblies 80 attached thereto, by stitching, adhesive application, or any other suitable attachment means. Each roller assembly 80 is structured and positioned to facilitate relative motion between the rear-most bladder 76k and the airfoil skin 64 during reconfiguration of the airfoil system 30. This aspect facilitates changes in airfoil configuration by minimizing friction between the rear-most bladder 76k and the airfoil skin 64 during reconfiguration. This may be especially useful during modifications of airfoil angle θ and situations where one of spools 54, 60 is rotated while the other spool is held static, which may produce relative motion between the airfoil skin 64 and the rear-most bladder 76k.

The roller assembly 80 shown in FIG. 3 is configured to span a relatively large potential arc of contact between the airfoil skin 64 and the rear-most bladder 76k. In one or more arrangements, and as shown in the drawings, the roller assembly 80 may incorporate a plurality of lobes 80a, 80b, 80c configured to spread apart from each other so as to space the airfoil skin apart from the rear-most bladder 76k along the trailing edge 34 of the airfoil. A roller 81 extends from each of lobes 80a, 80b, 80c to provide a rolling interface between the airfoil skin 64 and the rear-most bladder 76k.

However, other configurations of roller assembly are also possible. For example, a single-roller configuration is also possible. In another example, a housing (not shown) containing multiple ball bearings rotatably mounted therein and positioned between the airfoil skin and the rear-most bladder 76k may be provided.

Figure 1C:
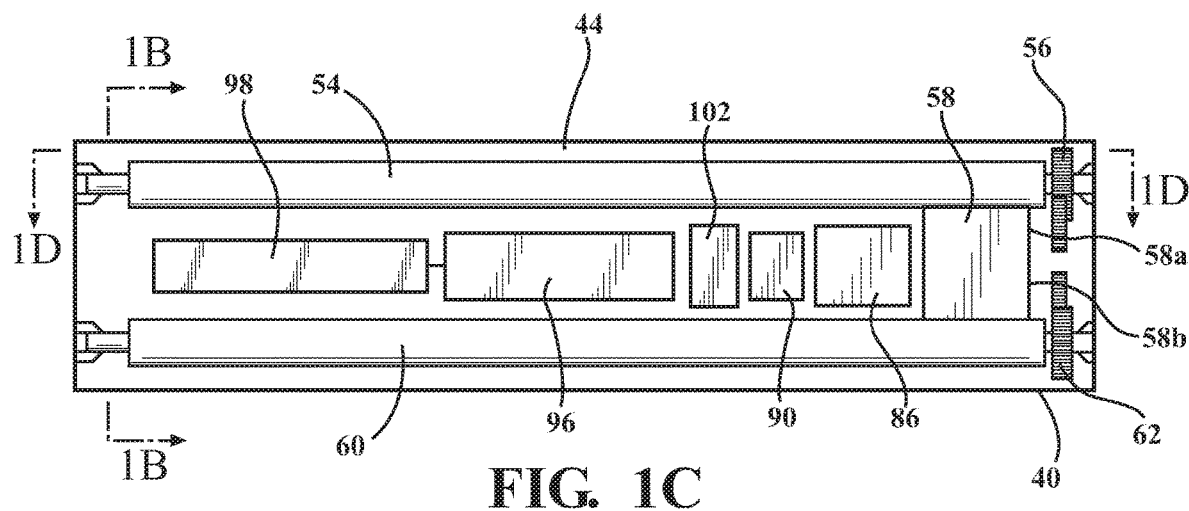
FIG. 1C is a schematic front cross-sectional view of the morphing airfoil system shown in FIG. 1A.
Figure 1D:
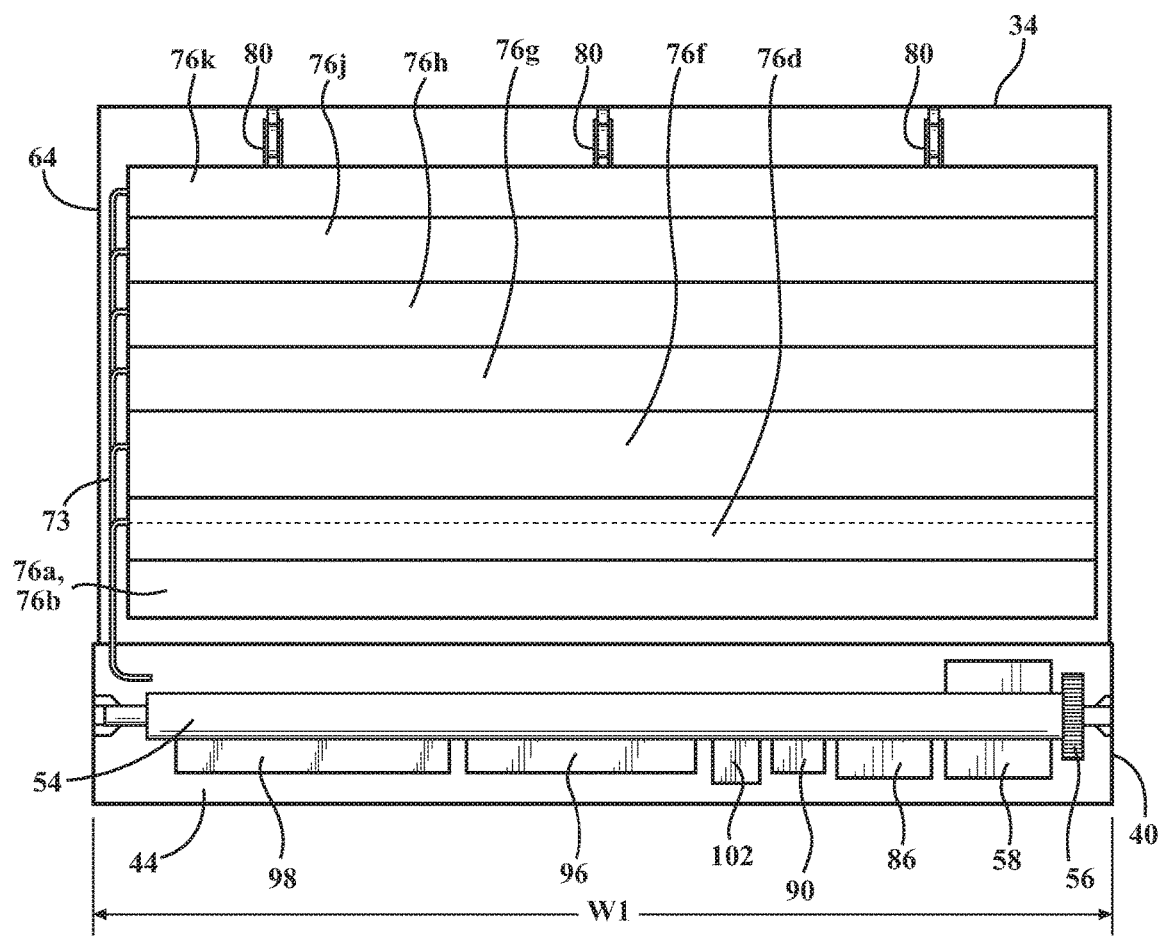
FIG. 1D is a schematic plan cross-sectional view of the morphing airfoil system shown in FIG. 1A.

Referring to FIGS. 1C and 1D, in one or more arrangements, the morphing airfoil system 30 may include a spool drive mechanism (generally designated 58) positioned within bulkhead cavity 44 and operably coupled to the first and second spools 54, 60 for rotating the spools responsive to a spool control command. The spool drive mechanism 58 may be operable to rotate each spool separately and also to rotate the spools simultaneously in a coordinated fashion when required by a particular application. The rotational speeds of the spools may also be controlled individually. The spool drive mechanism 58 may be configured to stop rotation of the spools when a predetermined tension force is reached in the airfoil skin, to aid in preventing damage to the airfoil skin and/or to the mechanism 58.

In one or more arrangements, the spool drive mechanism 58 may include such elements as an electric motor and output gears (or other motion transfer elements) 58a, 58b designed to mesh with corresponding ones of motion transfer elements 56, 62 on the first and second spools 54, 60. Other rotational motion transfer methods (for example, belt drives, chain drives. etc.) may also be used. The spool drive mechanism 58 may be powered through a power line (not shown) connected to a vehicle (not shown) on which the airfoil system 30 is mounted. Alternatively, the spool drive mechanism 58 may be powered by a battery 86 mounted within bulkhead cavity 44. The battery 86 may be rechargeable by a power source (e.g., the vehicle engine) in the vehicle, or the battery 86 may be operably coupled to a generator 90 in the bulkhead cavity 44 for recharging. The generator 90 may optionally be powered by a turbine blade 92 (described in greater detail below) which may be detachably mountable on the bulkhead. The spool drive mechanism 58 may include one or more actuators (not shown) if needed to provide or facilitate operation of the spools 54, 60 as described herein. Any suitable actuators can be used. For instance, the one or more actuators can include motors, pneumatic actuators, hydraulic pistons, relays, solenoids, and/or piezoelectric actuators, just to name a few possibilities.

In one or more arrangements, the morphing airfoil system 30 may include a bladder pressurization mechanism 94 configured for supplying inflation gas to the bladders 76a-76k, to control pressurization of the bladders. In one or more arrangements, the bladder pressurization mechanism 94 may include a compressor or other pressurized gas source (such as a pressurized gas tank) 96 to provide pressurized gas for inflation of the bladders. The compressor/pressurized gas source and/or other elements of the bladder pressurization mechanism 94 may be located in the bulkhead cavity 44 or in a vehicle to which the airfoil system 30 is attached. A gas source 96 located in the bulkhead 40 may be powered by a power line from the vehicle, by battery 86 incorporated into the bulkhead cavity 44, or by generator 90 operably coupled to a turbine blade 92 (described in greater detail below) optionally rotatably mounted on the bulkhead 40. In one or more arrangements, aspects of compressor operation may be controlled manually and/or autonomously, by suitably configured processors (such as airfoil control system processor(s) 104) responsive to user-generated commands or sensor data, for example.

A set of bladder inflation control valves 98 may be provided for selectively directing pressurized gas to individual bladders 76a-76k. Gas may be transferred to each individual bladder using an associated gas supply line extending from a valve to the bladder. Gas may also be exhausted or bled from the bladder by simultaneously opening a valve controlling flow to the bladder and operating one or more of the first and second spools to wind portion(s) of the airfoil skin, thereby tensioning the skin to contract the volume of airfoil body cavity 72, thereby forcing gas from the bladder through the opened valve. In one or more arrangements, the control valves 98 may be located in the bulkhead cavity 44. In one or more arrangements, selective opening and closing of individual ones of control valves 98 may be controlled manually and/or autonomously, by suitably configured processors responsive to user-generated commands or sensor data, for example.

The bladder pressurization mechanism 94 may include one or more actuators (not shown) needed to provide or facilitate operation of the bladder pressurization function as described herein. For example, certain actuators may be configured to open or close selected ones of the bladder inflation control valves 98 responsive to control signals from the processor(s) 104. Any suitable actuators can be used. For instance, the one or more actuators can include motors, pneumatic actuators, hydraulic pistons, relays, solenoids, and/or piezoelectric actuators, just to name a few possibilities. In one or more arrangements, aspects of compressor operation may be controlled manually and/or autonomously, by suitably configured processors (such as airfoil control system processor(s) 104, described herein).

In addition to the actuators previously described, the morphing airfoil system 30 may include other actuators 101 (shown schematically in FIG. 5 as operably coupled to other components of the morphing airfoil system). The actuators can generally include be any element or combination of elements operable to modify, adjust and/or alter one or more components and/or mechanisms of the morphing airfoil system 30 in a manner described herein, responsive to receiving control signals. Any suitable actuator can be used. For instance, the one or more actuators 101 can include motors, pneumatic actuators, hydraulic pistons, relays, solenoids, and/or piezoelectric actuators, just to name a few possibilities.

Power to any of the morphing airfoil mechanisms or elements mounted to or in the bulkhead 40 may be supplied by one or more of battery 86 and a power source (such as a vehicle power source) external to the airfoil assembly. Alternatively, power may be supplied by one or more solar panels 180 (FIG. 9) operably connected to the airfoil, as described herein.

Battery 86 may be positioned within the bulkhead cavity 44 for powering the compressor 96, the control valves 98, the spool drive mechanism 58, and/or other elements of the morphing airfoil system.

Figure 4:
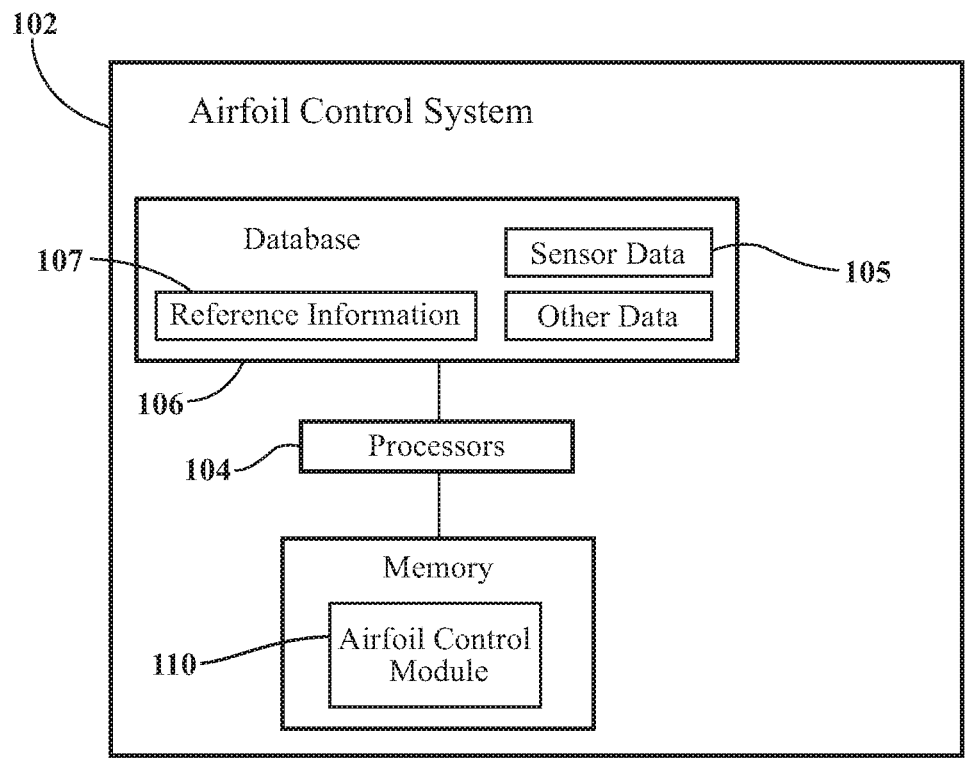
FIG. 4 is a schematic block diagram of an embodiment of an airfoil control system configured for controlling the morphing airfoil system shown in FIG. 1A.
Figure 6:
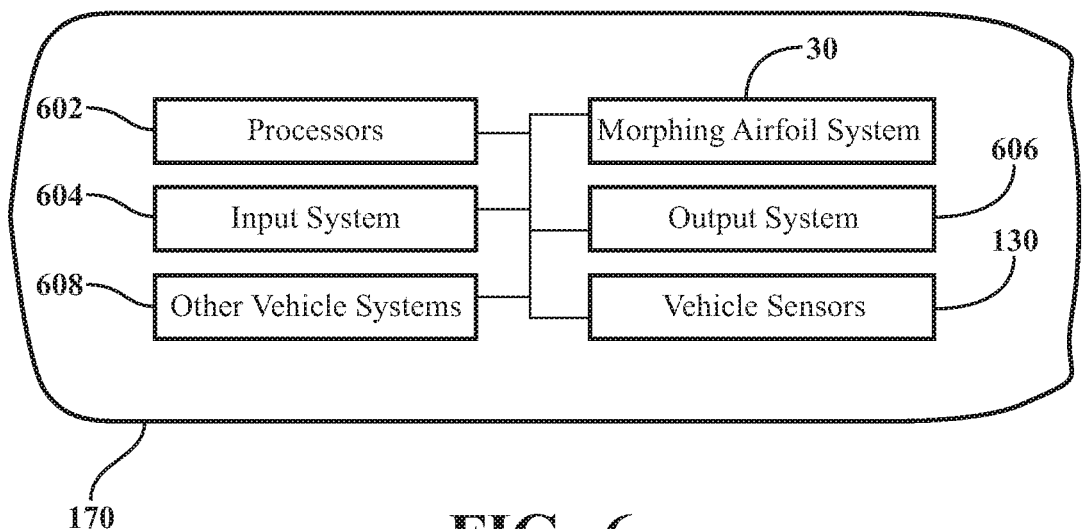
FIG. 6 is a schematic block diagram of a vehicle incorporating a morphing airfoil system in accordance with an embodiment described herein.

FIG. 4 is a schematic block diagram of an embodiment of an airfoil control system configured for controlling the morphing airfoil system shown in FIG. 1A. FIG. 5 is a block schematic diagram of the morphing airfoil system shown in FIGS. 1A-1D and previously described. FIG. 6 shows one embodiment of a vehicle 170 incorporating a morphing airfoil system 30 in accordance with an embodiment described herein. The vehicle 170 can include an input system 604. An "input system" includes any device, component, system, element or arrangement or groups thereof that enable information/data to be entered into a machine. The input system 604 can receive an input from a vehicle passenger (e.g. a driver or a passenger). The vehicle 170 can include an output system 606. An "output system" includes any device, component, or arrangement or groups thereof that enable information/data to be presented to a vehicle passenger (e.g. a person, a vehicle passenger, etc.). In one or more arrangements, the airfoil may be manually controlled from a vehicle control console using the input system 604 and output system 606. A user may receive sensor data relating to vehicle drag, weight, airflow speed, etc. via the output system, and may use the input system to control airfoil configuration parameters such as angle, chord length, and thickness responsive to the sensor data. The vehicle 170 may also include other vehicle processors 602 and other vehicle systems 608.

Referring to the drawings and particularly to FIG. 4, an airfoil control system 102 may control operation of the components of the airfoil system 30 (including inflation/deflation of bladders and operation of the spools 54, 60 to wind/unwind portions of the airfoil skin) to configure the airfoil system 30 to satisfy one or more particular purposes. FIG. 4 shows one embodiment of an airfoil control system 102. Airfoil control system 102 may be configured for controlling operations to reconfigure the airfoil system 30 responsive to commands received from a human user, or autonomously based on sensor data, programmed instructions, and/or other inputs. While the airfoil control system 102 is illustrated as a component of the morphing airfoil system 30, in various embodiments, the airfoil control system 102 can be at least partially integrated with a vehicle 170 (FIG. 6) on which the airfoil is mounted, as part of a vehicle control system, or separate from the vehicle 170. Thus, in one or more embodiments, the airfoil control system 102 can communicate via a wired or wireless connection with the vehicle 170 to achieve aspects of the functionality discussed herein.

In one or more arrangements, some or all elements of the airfoil control system 102 may be located in the bulkhead cavity 44 or otherwise attached to the bulkhead 40, so that the morphing airfoil system 30 may be added to a vehicle (not shown) in a modular fashion as a retrofit, if desired. The bulkhead 40 may be mounted to the vehicle 170 at a suitable location, and any required connections between the airfoil system 30 and the vehicle (for power, information exchange, etc.) may be made during the airfoil system installation process. Elements of the airfoil control system 102 may be connected internally with each other using a data bus or another communication path. In other arrangements, certain elements of the airfoil control system 102 may be connected wirelessly using suitable wireless communications interfaces.

Generally, the airfoil configuration may be controlled by controlling inflation and/or deflation of one or more of the inflatable/deflatable bladders 76a-76k and/or by operating one or more of the spools 54, 60 to shorten or lengthen the airfoil body 70 (i.e., the portion of the airfoil extending rearwardly from the bulkhead 40). Referring again to FIG. 2, in one example of an airfoil control operation, a thickness T1 of at least a portion of the airfoil may be increased (from T1 to T1', for example). As the airfoil configuration reconfigures or "morphs" as described herein, the length of the chord 32 and/or the orientation or angle θ of the airfoil 31 with respect to the vector V1 representing the direction of the impinging airflow may change accordingly, by increasing pressure in of one or more of the inflatable/deflatable bladders 76a-76k to expand the bladder(s), in conjunction with simultaneously or sequentially unwinding a first portion of the airfoil skin 64 from the first spool 54 so as to increase a length of the airfoil skin extending between the trailing edge 34 of the airfoil 31 and the first spool 54, and unwinding a second portion of the airfoil skin 64 from the second spool 60 so as to increase a length of the airfoil skin extending between the trailing edge 34 of the airfoil and the second spool. Unwinding portions of the airfoil skin 64 to compensate for the thickness increase may increase the airfoil thickness without necessarily reducing the airfoil chord length CL.

Referring again to FIG. 2, in another example of an airfoil control operation, the thickness T1 of at least a portion of the airfoil may be decreased (from T1' to T1, for example) by decreasing pressure in one or more of bladders 76a-76k to contract the bladder (or to enable the bladder to contract under external pressure), in conjunction with simultaneously or sequentially winding a first portion of the airfoil skin 64 around the first spool 54 so as to decrease a length of the airfoil skin extending between the trailing edge 34 and the first spool 54, and winding a second portion of the airfoil skin 64 around the second spool 60 so as to decrease a length of the airfoil skin extending between the trailing edge 34 and the second spool 60. Winding portions of the airfoil skin 64 to compensate for the thickness decrease may decrease the airfoil thickness without necessarily increasing the chord length CL. Decreasing the thickness of the airfoil may improve the aerodynamic characteristics of the airfoil when traveling at relatively higher speeds.

Referring to FIG. 7, in another example of an airfoil control operation, an angle θ of the airfoil 31 may be controlled by rotating one of the first spool 54 and the second spool 60 so as to wind a first portion of the airfoil skin 64 around the one of the first spool and the second spool, so as to shorten a portion of the airfoil skin 64 extending between the trailing edge 34 of the airfoil and the one of the first spool 54 and the second spool 60, and simultaneously rotating the other one of the first spool 54 and the second spool 60 so as to unwind a second portion of the airfoil skin 64 from the other one of the first spool 54 and the second spool 60 so as to lengthen a portion of the airfoil skin extending between the trailing edge 34 and the other one of the first spool 54 and the second spool 60. For example, winding a portion of the airfoil skin 64 around the first spool 54 while unwinding another portion of the airfoil from the second spool 60 may raise the airfoil trailing edge 34 to provide an airfoil configuration (such as configuration 30-1 shown in FIG. 7) having a positive angle θ. This configuration may provide increased downforce. In addition, the increase in downforce may correspond to the positive magnitude of the angle θ, for a range of angle values.

In another example, winding a portion of the airfoil skin 64 around the second spool 60 while unwinding another portion of the airfoil from the first spool 54 may lower the airfoil trailing edge 34 to provide an airfoil configuration having a negative angle θ, such as configuration 30-2 shown in FIG. 7. This configuration may provide additional lift (or a decrease in downforce). In addition, the increase in lift may correspond to the negative magnitude of the angle θ, for a range of angle values. Increased lift may be useful where the vehicle is relatively heavy and it is determined that the increased lift may increase fuel economy without jeopardizing vehicle handling or stability.

If needed to facilitate reconfiguration to a desired positive or negative angle, the pressure in one or more one or more of the bladders 76a-76k may simultaneously be increased or decreased.

Referring to FIG. 8, in another example of an airfoil control operation, a chord length CL of the airfoil chord 32 may be increased (from CL1 to CL2, for example) by increasing pressure in one or more of bladders 76a-76k so as to expand the bladder(s), in conjunction with simultaneously unwinding a first portion of the airfoil skin 64 from the first spool 54 so as to increase a length of the airfoil skin extending between the trailing edge 34 and the first spool 54, and unwinding a second portion of the airfoil skin 64 from the second spool 60 so as to increase a length of the airfoil skin extending between the trailing edge 34 and the second spool 60. This may increase the chord length from CL1 shown in FIG. 8 to CL2. Increasing the chord length CL may provide increased lift if the angle θ of the airfoil is negative, and increased downforce if the angle θ of the airfoil is positive. Increasing the downforce may be useful where, for example, it is desired to increase contact forces between the vehicle and a road surface to enhance handling and stability.

In another example of an airfoil control operation, a chord length of the airfoil may be decreased by decreasing the pressure in at least one of bladders 76a-76k in conjunction with simultaneously winding a first portion of the airfoil skin 64 around the first spool 54 so as to decrease a length of the airfoil skin extending between the trailing edge 34 and the first spool 54, and winding a second portion of the airfoil skin 64 around the second spool 60 so as to decrease a length of the airfoil skin extending between the trailing edge 34 and the second spool 60.

FIG. 4 is a schematic block diagram of one embodiment of an airfoil control system 102. In one or more arrangements, the airfoil control system 102 may also be configured to enable manual control of the airfoil configuration by a human user. For example, menu driven manual commands may be generated using a vehicle input system (such as input system 604 shown in FIG. 6) when operably coupled to the airfoil control system 102. Manual commands may be received by the airfoil control system processor(s) 104 (described in greater detail below). Processor(s) 104 may be configured to control elements of the airfoil system (such as spools 54, 60 and bladder pressurization mechanism 94) to implement user commands. Processor(s) 104 may be configured to communicate airfoil status (angle, length, thickness, etc.), parameter values, warnings, and other information to the user through the vehicle output system. The various components of the control system 102 (such as spools 54, 60 and bladder pressurization mechanism 94) may be controlled individually to affect the airfoil configuration, or the components of the control system 102 can be controlled simultaneously, in any combination needed to provide a desired airfoil configuration.

The processor(s) 104 may also be configured to interact with a user in user attempts to control the airfoil system 30. For example, the processor(s) 104 may be configured to interact with the vehicle input system 604 to enable a user to input a proposed airfoil angle θ, and to receive an estimate from the processor(s) (via the vehicle output system) of the effect the new airfoil angle would have on vehicle fuel economy or road handling, for example. In one or more arrangements, the airfoil control system 102 may be configured to inform a user of the effects (for example, increased downforce, increased fuel-consumption) of any proposed variation of any controllable airfoil parameter (for example, changing the airfoil angle).

Airfoil control system 102 may also be configured for autonomously controlling the airfoil system 30 to aid in maximizing, minimizing, and/or optimizing the components of certain vehicle performance parameters which may be affected by the airfoil configuration. For example, to the degree that vehicle fuel economy may be affected by the configuration of the airfoil system 30, this configuration may be controlled as described herein by the airfoil control system 102.

While fuel economy and road response (or road handling) will be described herein as representative examples of performance characteristics which may be affected by controlling airfoil configuration, it will be realized that other performance characteristics may also be affected, provided that they are dependent to some degree on controllable aspects of the airfoil configuration.

The airfoil control system 102 may include one or more processor(s) 104. In one or more arrangements, the processor(s) 104 can be an electronic control unit (ECU) configured for controlling operation of the various components of the morphing airfoil system 30. The processor(s) 104 may be a part of the airfoil control system 102 as shown, or the airfoil control system processor may be a processor of the vehicle 170 (such as vehicle processor(s) 602, FIG. 6). Processor(s) 104 may communicate with other elements of the airfoil control system 102 and/or the vehicle 170 in a known manner, for example, wirelessly or through a data bus or another communication path.

The morphing airfoil system 30 may include various sensors 124 configured to provide data to the airfoil control system 102 for use in formulating control commands. The sensors 124 may include sensors configured to detect information relating to the airflow around the airfoil, the pressure and temperatures experienced by the airfoil components, and other pertinent parameters. For example, sensors 124 may include bladder exterior pressure sensors 124a and bladder internal pressure sensors 124b, information from which pressure differentials experienced by the bladder walls may be determined. This may aid in detecting severe pressure differentials or over-stress conditions which may result in bursting of a bladder. These over-stress sensors may be operably coupled to the airfoil control system 102. The control system 102 may be configured to, if an over-stress condition is detected in a bladder, operate any of control valves 98 associated with the over-stressed bladder to vent pressurized gas from the bladder until the over-stress condition is relieved. The control system 102 may also be configured to operate the spool drive mechanism 58 to unwind a portion of the airfoil skin 64 to aid in relieving pressure on one or more of the bladders 76a-76k.

Sensors 124 may also include airflow speed sensors 124c and airflow direction sensors 124d for detecting the speed and direction of an airflow impinging on the airfoil leading edge 38. Drag-related sensors 124e may be positioned at various locations along the bulkhead 40 and airfoil skin 64 to provide information on drag-related parameters. Airfoil body temperature sensors 124f may be positioned within the airfoil body cavity 72 and/or along exterior surfaces of the bladders 76a-76k for detecting excessive temperature conditions which may impede efficient operation of the airfoil system 30. Other types of sensors 124g may also be included.

The morphing airfoil system 30 may also be in wireless communication with non-vehicle road condition sensors 131 and/or other non-vehicle sensors, for receiving additional information pertinent to operation of the airfoil system. In addition, airfoil control system processor(s) 104 may be configured for operable coupling to one or more vehicle sensors (collectively designated 130) if desired, so that additional information useful for operation of the airfoil 31 may be acquired. Vehicle sensor data pertinent to efficient operation of the morphing airfoil system may include information from vehicle weight sensors 130a, vehicle road speed sensors 130b, vehicle road condition sensors 130c, vehicle wind speed sensors 130d, vehicle wind direction sensors 130e, and other vehicle sensors 130f. The vehicle downforce may be measured by suitable vehicle weight sensors as a function of the weight of the portions of the vehicle (including the portion of the vehicle on which the airfoil system 30 is mounted) supported by the vehicle road wheels. Detected or calculated parameters pertinent to efficient operation of the morphing airfoil system 30 may include aerodynamic drag, lift force, down force, projected gas mileage, and other parameters.

With continued reference to the airfoil control system 102, the control system 102 may include a database 106. The database 106 may be an electronic data structure stored in memory 108 of the airfoil control system 102, or the database 106 may be stored separately from the memory 108 as shown in FIG. 4. The database 106 may be configured with routines that can be executed by the processor(s) 104 for analyzing data, providing stored data, organizing stored data, and so on. Thus, in one embodiment, the database 106 stores data used by the various module(s) of the airfoil control system 102 in executing various functions.

Reference information 107 may include information such as formulae, look-up tables and information contained in graphs translated into a digitally-processible form. Reference information may include, for example, methods usable by processor(s) 104 for estimating vehicle fuel-consumption for various values of lift and/or downforce applied to a vehicle operating at a given vehicle weight. Such information may be usable by the processor(s) 104 to aid in optimizing various aerodynamic response parameters and/or for informing a human user regarding the effects of a proposed change in airfoil configuration.

In another example, the reference information 107 may include information useable by the processor(s) in an autonomous procedure directed to optimizing downforce to increase vehicle traction while minimizing impact on fuel-consumption. Such information, used in combination with pertinent sensor data, may enable the processor(s) 104 to determine an optimum airfoil configuration for balancing various conflicting requirements, and also to determine a maximum or minimum value of an airfoil configuration parameter which may be safely implemented. Information relating to maximum and minimum safe values of aerodynamic characteristics (and the airfoil configuration parameters which may provide these maximum and minimum safe values) for use as control limits for a particular morphing airfoil design may be compiled and stored in the reference information 107. In addition, the processor(s) 104 may be configured to use the reference information 107 and/or other information in conjunction with sensor data to calculate or otherwise determine the maximum and minimum control limits. These maximum and minimum control limits may be recalculated continuously (i.e., as rapidly as possible given data acquisition and processing cycle times) or at regular intervals.

Reference information 107 may also include airflow tables containing information relating various sensor data parameters (such as direction and speed of airflow impinging on the airfoil leading edge) to various possible airfoil configuration parameters (such as chord length). Such information may be determined analytically or experimentally and compiled for use by the processor(s) 104 in determining an optimum configuration of the airfoil or for maximizing or minimizing certain specified aerodynamic characteristics, such as lift and downforce exerted by the airfoil on the vehicle. Using the sensor data and airflow table information, processor(s) 104 may execute instructions stored in the airfoil control system module(s) to autonomously control operation of the bladder pressurization mechanism 94, spool drive mechanism 58, and other elements of the airfoil system 30. Database may also store or buffer sensor data 105 acquired or received from the various vehicle sensors 130 and morphing airfoil system sensors 124.

In one embodiment, the airfoil control system 102 includes a memory 108 that stores one or more modules as described herein. The memory 108 is a random-access memory (RAM), read-only memory (ROM), a hard-disk drive, a flash memory, or other suitable memory for storing the module(s) described herein. The module(s) are, for example, computer-readable instructions that when executed by the processor(s) 104, cause the processor(s) 104 to perform the various control functions disclosed herein.

An airfoil control module 110 is described herein. Airfoil control module 110 may be incorporated into airfoil control system 102. However, the airfoil control system 102 may incorporate more than one module, depending on the requirements of a particular application. Module 110 can be implemented as computer-readable program code that, when executed by a processor (such as processor(s) 104 or 602), implement one or more of the various processes described herein. Module 110 can be a component of the processor(s) 104, or the module can be executed on and/or distributed among other processing systems to which the processor(s) 104 is operably connected. The module 110 can include instructions (e.g., program logic) executable by one or more processor(s) 104.

In one or more arrangements, the module 110 described herein can include artificial or computational intelligence elements, e.g., neural network, fuzzy logic or other machine learning algorithms. Further, in one or more arrangements, the module 110 can be distributed among a plurality other modules, in an embodiment of the control system including multiple modules.

In one or more arrangements, the airfoil control module 110 can be configured to vary one or more controllable airfoil parameters (such as chord length, angle, thickness, etc.) in a predetermined manner, either simultaneously or in sequence, in order to optimize one or more user-selected parameters, such as fuel-economy or road response, for example. The term "optimization" as used herein reflects the fact that one or more airfoil configuration parameters (such as airfoil length or airfoil angle) may be varied to attempt to maximize a first, desirable performance parameter (such as fuel economy or road response), but that the maximization of the first performance parameter may be restricted by control limits applicable to one or more other performance parameters.

The term "downforce" as used herein in a ground vehicle application refers to a force with which the vehicle contacts a road surface on which it resides. The downforce is a function of vehicle weight and also of the downward reaction force acting on the airfoil, produced by an airflow impinging on the airfoil and which is re-directed upwardly from the airfoil.

To help maximize fuel economy, it is desirable to minimize the vehicle downforce. However, the optimum fuel economy for a given set of driving conditions may not be the maximum fuel economy because, in decreasing the downforce to maximize fuel economy, the downforce may be decreased to a point where it impairs vehicle handling. Thus, unrestrained minimization of downforce to promote fuel economy may adversely affect road handling to an undesirable degree. In another example, unrestrained maximization of downforce to increase road response may adversely affect fuel economy to an undesirable degree. Consequently, predetermined control limits may be set and applied for fuel economy and/or other parameters when road handling characteristics are to be optimized. Similarly, predetermined control limits may be set and applied for downforce and/or other parameters when fuel economy is to be optimized.

When these control limits are applied, one or more controllable features of the airfoil system 30 may be controlled to correspondingly control the desired or primary parameter (for example, fuel economy or road handling) so as to maximize (or minimize) the primary parameter to a point where it will begin to adversely affect one or more other, secondary parameters to a degree which exceeds or violates the applicable control limits. At this point, the desired parameter may be considered to be optimized. In cases where control limits do not apply to a secondary parameter, the primary parameter selected by the user for optimization, the primary parameter value may be maximized (or minimized) to the greatest degree possible by operation of the airfoil system 30, at which point the primary parameter will be considered to be optimized.

One or more of the control limits may be pre-programmed into the control system, or one or more of the control limits may be selected by a user. Alternatively, one or more of the control limits may be determined and set autonomously by the control system based on such factors as vehicle speed, current road conditions, etc. For example, a user may select to optimize road response (the primary parameter, selected by the user for optimization). Road response may be defined generally as vehicle handling characteristics affected by contact force between the vehicle wheels and the road surface. The airfoil control system 102 may control the configuration of the airfoil 31 so as to increase downforce to improve road handling. However, if a control limit is applied to fuel economy (a secondary parameter in this case) to prevent the fuel economy from falling below a predetermined value as a result of airfoil control operations, the control system 102 may control the airfoil 31 to increase the downforce only to a point where the fuel economy control limit is reached.

The current fuel economy estimate may be continuously recalculated or otherwise re-determined as the airfoil configuration is controlled, to monitor airfoil effects on road handling characteristics. Similarly, values of parameters such as downforce pertinent to the road handling characteristics may be continuously recalculated or otherwise re-determined as the airfoil configuration is controlled. Control limits may be stored in the database reference information 107 or in any other suitable location.

Road handling characteristics which may be affected by airfoil control may include downforce and/or any other pertinent parameters which may enter into a calculation or determination of vehicle road handling ability. Thus, the road handling characteristics used as targets and as feedback for airfoil modification may be based only (or primarily) on downforce, or the road handling characteristics may be based on an amalgam or integration of the values of several other parameters, including downforce.

Various sources (such as formulae, look-up tables, etc.) usable for calculating or determining the values of such parameters for given inputs (such as vehicle speed and/or other sensor data) may be stored in database 106 or in any other suitable location of location(s). Similarly, sources (such as formulae, look-up tables, etc.) usable for calculating or determining the current values of any other parameters (such as vehicle drag, fuel economy, downforce, etc.) used by the control system for any purpose described herein may be stored in database 106 or in any other suitable location or location(s).

The information provided from the various sources may be used in conjunction with sensor data and any other pertinent information to generate a quantity or specific numerical value of the parameter selected for optimization, so that this value may be recalculated or determined responsive to changes in the airfoil configuration due to control commands. This enables a feedback loop to be implemented whereby airfoil system features are controlled to control airfoil configuration until the optimum values of the desired operational parameters are achieved as closely as possible. This control loop also enables the optimum (or near-optimum) values of the desired operational parameters to be maintained.

The airfoil control module 110 described herein may be configured to access, receive, calculate or otherwise determine control limits applicable to various secondary parameters which would be affected by airfoil configuration changes implemented to affect user-selected primary performance parameters in a desired manner. The module 110 described herein may be configured to, in a controlled manner, attempt to maximize or minimize a user-selected vehicle performance parameter in order to enhance vehicle performance or achieve a result desired by the user. The module 110 described herein may be configured to monitor the effects of airfoil configuration changes on these secondary parameters, and to stop further changes to the airfoil configuration which would cause applicable control limits to be exceeded.

The module 110 described herein may be configured to, if a control limit applicable to one or more secondary parameters is violated or exceeded, control one or more components of the airfoil system 30 so as to return the secondary parameter to a value within the applicable control limit. In one or more arrangements, the module 110 described herein may be configured to calculate or otherwise determine control limits for a given application, using such information as user preferences, vehicle sensor data, airfoil sensor data, information from database 106, and other available information. The control limits may be calculated or otherwise determined on a continuous basis, at regular time intervals, or in response to one or more events or occurrences. The current fuel economy, downforce, or any other parameter described herein may be re-determined and updated at regular time intervals or on a continuous basis, as frequently as possible in accordance with data acquisition and processing cycles.

In one or more arrangements, the airfoil control module 110 stored in memory 108 may be configured to control the configuration of the airfoil so as to optimize aspects of vehicle road response which may be affected by the configuration of the airfoil 31. Thus, road response may be the primary parameter sought to be affected by changing the airfoil configuration. The road response may be optimized by attempting to minimize the lift (or maximize the downforce) provided by the airfoil in accordance with control limits (if any) applicable to fuel economy, which (as a secondary parameter) may also be affected by maximizing the downforce. Downforce may be maximized by modifying the airfoil angle to maximize the downward force exerted on the airfoil by an impinging airflow, and/or by maximizing the length of the airfoil to accordingly maximize the airfoil surface area on which the impinging airflow acts.

Referring to now to FIG. 9, bulkhead 40 may be configured to enable mounting of an optional, removable turbine blade 92 thereon. The turbine blade may be mountable, for example, in an opening formed in the airfoil leading edge 38. The opening may be capped when not in use, so as not to interfere with airflow around the airfoil 31. The turbine blade 92 may be configured for operable coupling to the bulkhead and components mounted inside the bulkhead (for example, to generator 90), to enable battery 86 to be charged by rotation of the turbine blade 92 and/or to enable components of the airfoil system to be powered by the turbine blade 92.

Referring to FIG. 9, bulkhead 40 may be configured to enable mounting of an optional, removable pylon 172 thereon. Pylon 172 may be configured to support a solar panel 180 which may be optionally operably coupled to the airfoil 31 by a user. Pylon 172 may have an aerodynamically favorable shape to minimize any increase in drag which may result from attachment of the pylon 172 to the bulkhead 40. Pylon 172 may incorporate wiring (not shown) for electrically connecting the solar panel 180 to battery 86 or other components of the airfoil system 30. The solar panel may also be electrically coupled to any solar conversion elements (not shown) needed to facilitate conversion of solar energy absorbed by the solar panel into electrical energy usable for charging the battery 86 or powering other components of the airfoil system 30. Such solar conversion elements may be mounted within the bulkhead 40. The pylon may also have a length sufficient to space the solar panel 180 apart from the airfoil 31, so as to minimize interference with airflow over the airfoil. The airfoil 130 including the additional elements (turbine blade, pylon, solar panel) shown in FIG. 9 may be mounted on a ground vehicle or an aircraft, for example.

Figure 10A:
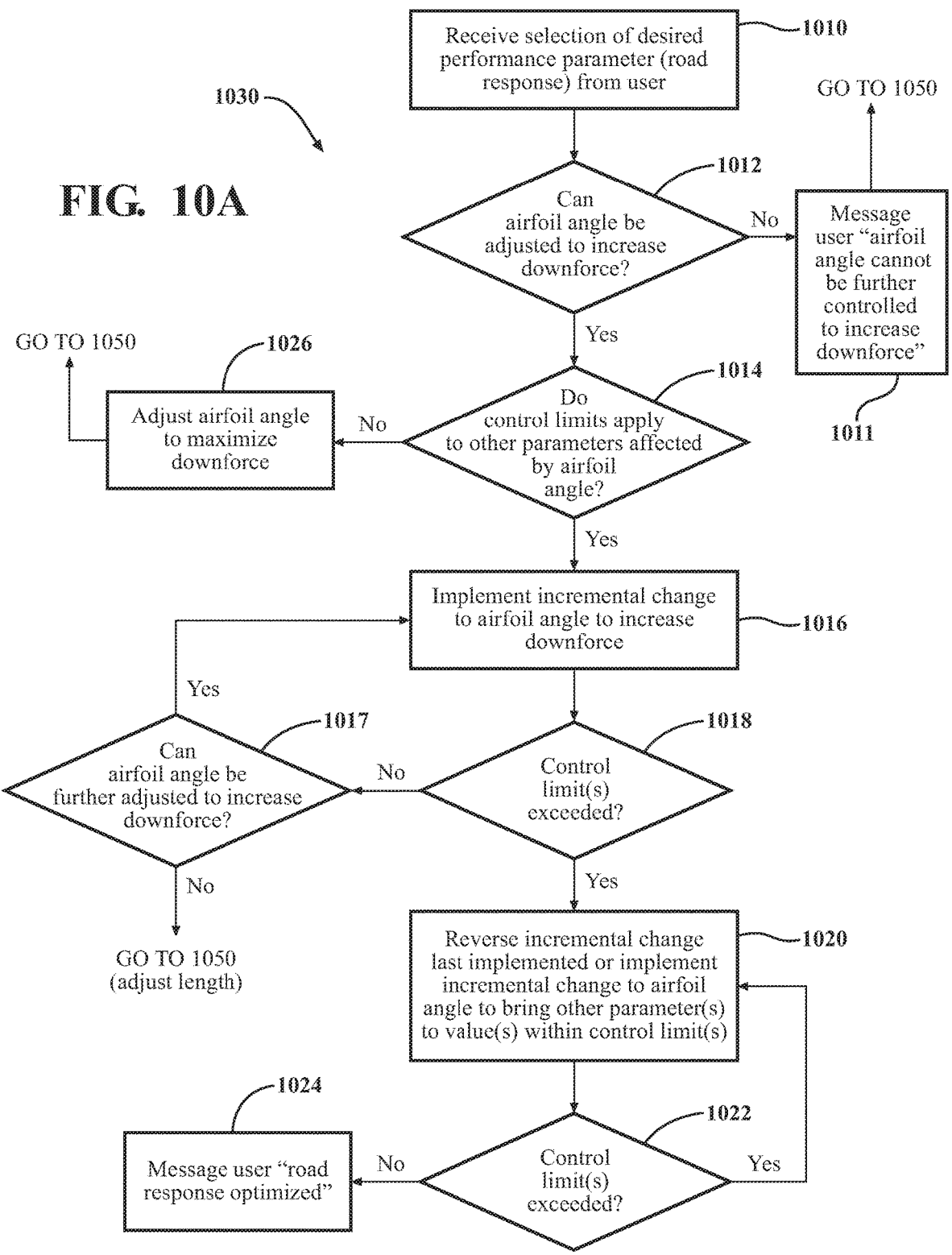
FIGS. 10A and 10B, in combination, show a flow diagram illustrating one embodiment of a method of optimizing the road handling capability of a ground vehicle using a morphing airfoil in accordance with an embodiment described herein.
Figure 10B:
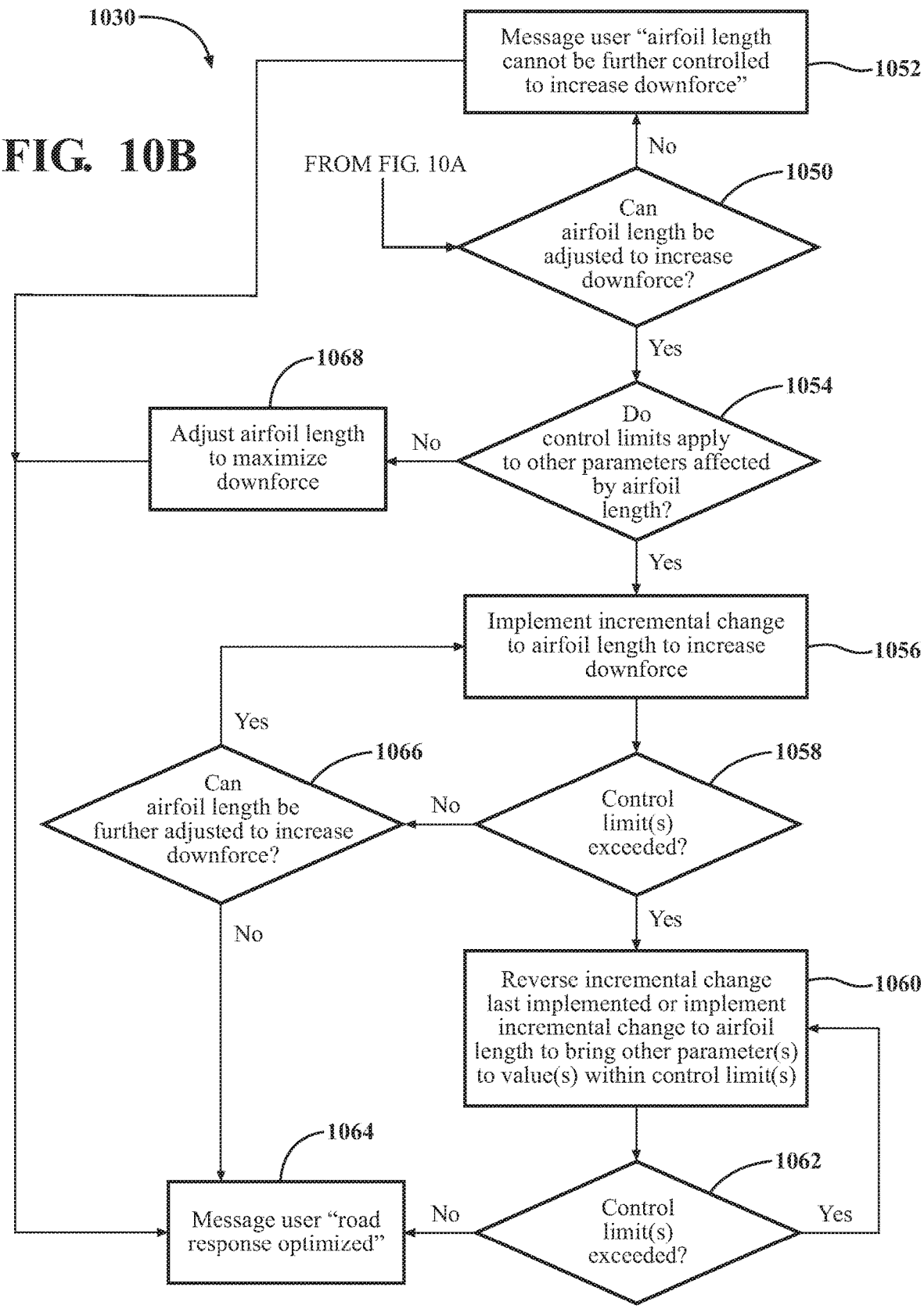

Additional aspects of controlling the airfoil configuration to optimize vehicle road response will be discussed in relation to FIGS. 10A and 10B. FIGS. 10A and 10B illustrate a flowchart of a method 1030 that is associated with optimizing vehicle road response. Method 1030 will be discussed from the perspective of the airfoil control system 102 of FIGS. 4 and 5. While method 1030 is discussed in combination with the airfoil control system 102, it should be appreciated that the method 1030 is not limited to being implemented within the airfoil control system 102, but is instead one example of a system that may implement the method 1030.

Referring to FIG. 10A, in block 1010, the control system 102 may receive from a user selection of a performance parameter to be optimized. In the example of FIGS. 10A and 10B, road response has been selected for optimization.

In block 1012, the control system 102 may determine if the airfoil angle can be adjusted to increase downforce, with a view to optimizing road response. For example, processor(s) 104 may determine the current angle of the airfoil and determine if the airfoil angle θ can be made positive (or more positive) as illustrated by configuration 30-1 of FIG. 7 to increase downforce. The control system 102 may be configured to attempt to modify the airfoil angle θ before modifying the airfoil chord length CL, because changing the airfoil angle may be less complicated and energy-intensive. However, if desired, the control system 102 may be alternatively configured to attempt to modify the airfoil chord length CL before modifying the airfoil angle θ.

If the airfoil angle θ cannot be modified to increase downforce, a message may be generated to the user (in bock 1011) that the airfoil angle cannot be further modified to increase downforce. Then control may pass to block 1050, where it is determined if the airfoil length can be modified to increase downforce.

However, if the airfoil angle θ can be modified to increase downforce, processor(s) 104 may determine (in block 1014) if any control limits apply to any secondary parameters that would be affected by changing the airfoil angle. If no control limits apply, the airfoil angle may be controlled (in block 1026) to adjust the airfoil angle to provide maximum downforce.

If control limits do apply to any secondary parameters that would affected by changing the airfoil angle θ, the control system 102 may (in block 1016) implement a predetermined incremental change to the airfoil angle directed to increasing downforce. The incremental change to the angle θ may be specified by a user, or the incremental change may be pre-programmed into the control system 102. For example, the incremental change to the angle θ may be 1°, 2°, or any other value.

After implementing the incremental change, the processor(s) 104 may determine (in block 1018) if any applicable control limits were exceeded by the previously executed incremental change. If no control limits were exceeded, control may pass to block 1017, where the system determines if the airfoil angle can be further adjusted to increase downforce. If the airfoil angle cannot be further adjusted to increase downforce, control may pass to block 1015, where it will be determined if the airfoil length can be adjusted to increase downforce.

If the airfoil angle can be further adjusted to increase downforce, control may pass back to block 1016, where another incremental change in angle may be implemented. However, if control limits were exceeded, control may pass to block 1020 where the previously executed incremental change may be reversed or the airfoil angle may be otherwise controlled in a manner designed to bring the secondary parameter(s) back within the applicable control limit(s).

Processor(s) 104 may then verify (in block 1022) that the control limits are no longer exceeded. If the control limits are still exceeded, control may pass back to block 1020 where the airfoil angle will be further controlled until the control limits are no longer exceeded. When the control limits are no longer exceeded, the downforce may be considered to have been optimized by changing the airfoil angle without the need to change the airfoil length.

Referring now to FIG. 10B, if it is not possible to further change the airfoil angle to increase downforce, the control system 102 may determine (in block 1050) if the airfoil length can be adjusted to increase the downforce. For example, if the airfoil angle is positive, it may be possible to increase the length of the airfoil to increase the surface area being affected by the moving airflow, thereby increasing the downward force acting on the airfoil.

If the airfoil length cannot be adjusted to increase the downforce, the control system 102 may (in block 1052) message the user that the airfoil length cannot be further controlled to increase downforce. The control system 102 may then (in block 1064) message the user that the airfoil configuration is optimized for road response, since the adjustable parameters of the airfoil can me modified no further to increase downforce. However, if the airfoil length can be adjusted to increase the downforce, processor(s) 104 may determine (in block 1054) if any control limits apply to any secondary parameters that would be affected by changing the airfoil angle. If no control limits apply, the airfoil length may be controlled (in block 1068) to adjust the airfoil length to provide maximum downforce.

If control limits do apply to any secondary parameters that would affected by changing the airfoil length, the control system 102 may implement a predetermined incremental change to the airfoil length directed to increasing downforce.

The incremental change to the length may be specified by a user, or the incremental change may be pre-programmed into the control system 102. For example, the incremental change to the length may be 2 inches, 5 inches, or any other value depending on the particular airfoil design and airfoil control system capabilities.

After implementing the incremental length change, the processor(s) 104 may determine (in block 1058) if any applicable control limits were exceeded by the previously executed incremental change. If no control limits were exceeded, control may pass to block 1066, where the system determines if the airfoil length can be further adjusted to increase downforce. If the airfoil angle cannot be further adjusted to increase downforce, control may pass to block 1064, where the user may be messaged that the road response is optimized.

If the airfoil angle can be further adjusted to increase downforce, control may pass back to block 1056, where another incremental change in length may be implemented. However, if control limits were exceeded, control may pass to block 1060 where the previously executed incremental length change may be reversed or the airfoil length may be otherwise controlled in a manner designed to bring the secondary parameter(s) back within the applicable control limit(s).

Processor(s) 104 may then (in block 1062) verify that the control limits are no longer exceeded. If the control limits are still exceeded, control may pass back to block 1060 where the airfoil length will be further controlled until the control limits are no longer exceeded. When the control limits are no longer exceeded, the downforce may be considered to have been optimized by changing the airfoil angle and/or the airfoil length.

Figure 11A:
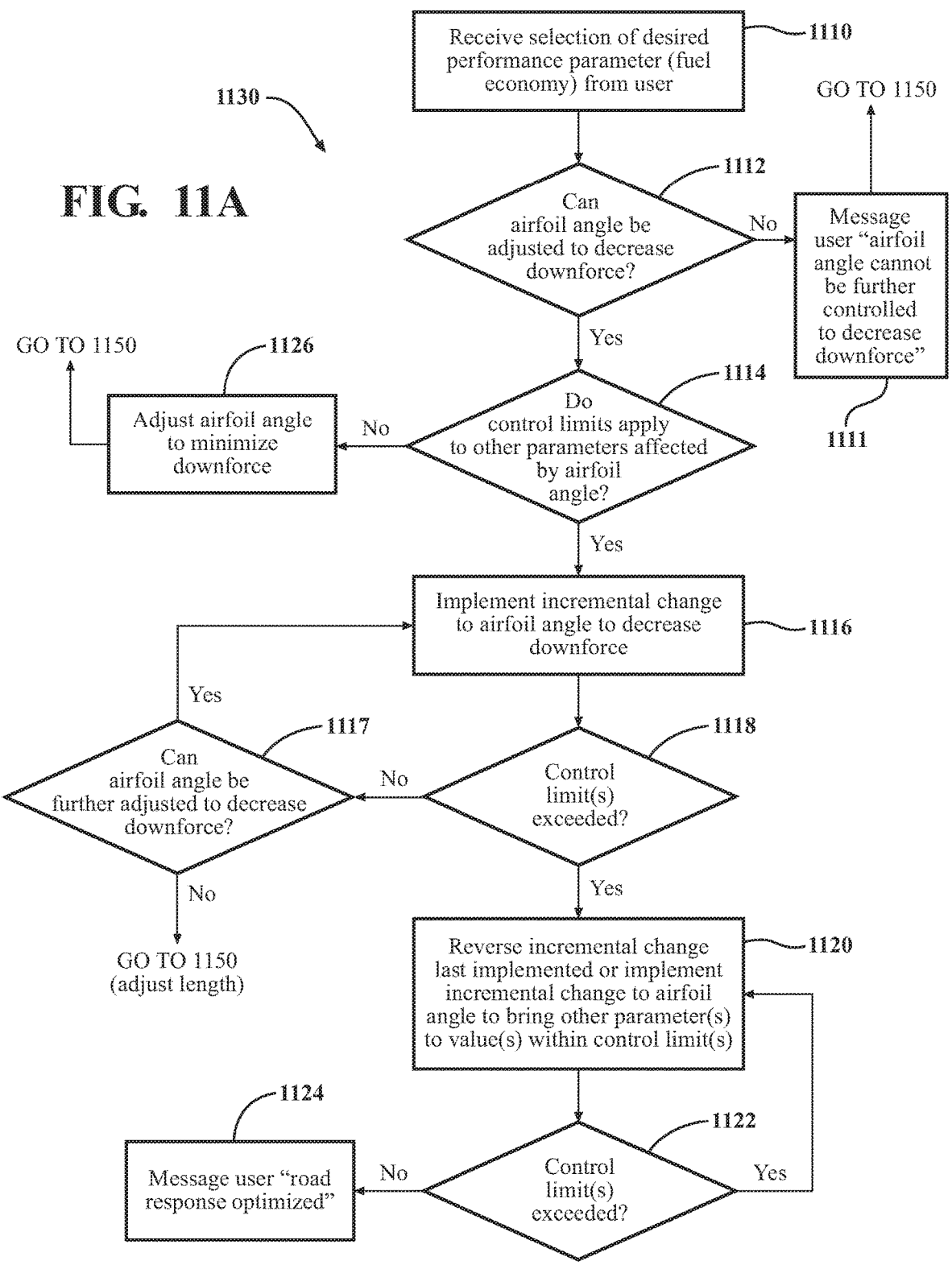
FIGS. 11A and 11B, in combination, show a flow diagram illustrating one embodiment of a method of optimizing the fuel economy of a ground vehicle using a morphing airfoil in accordance with an embodiment described herein.
Figure 11B:
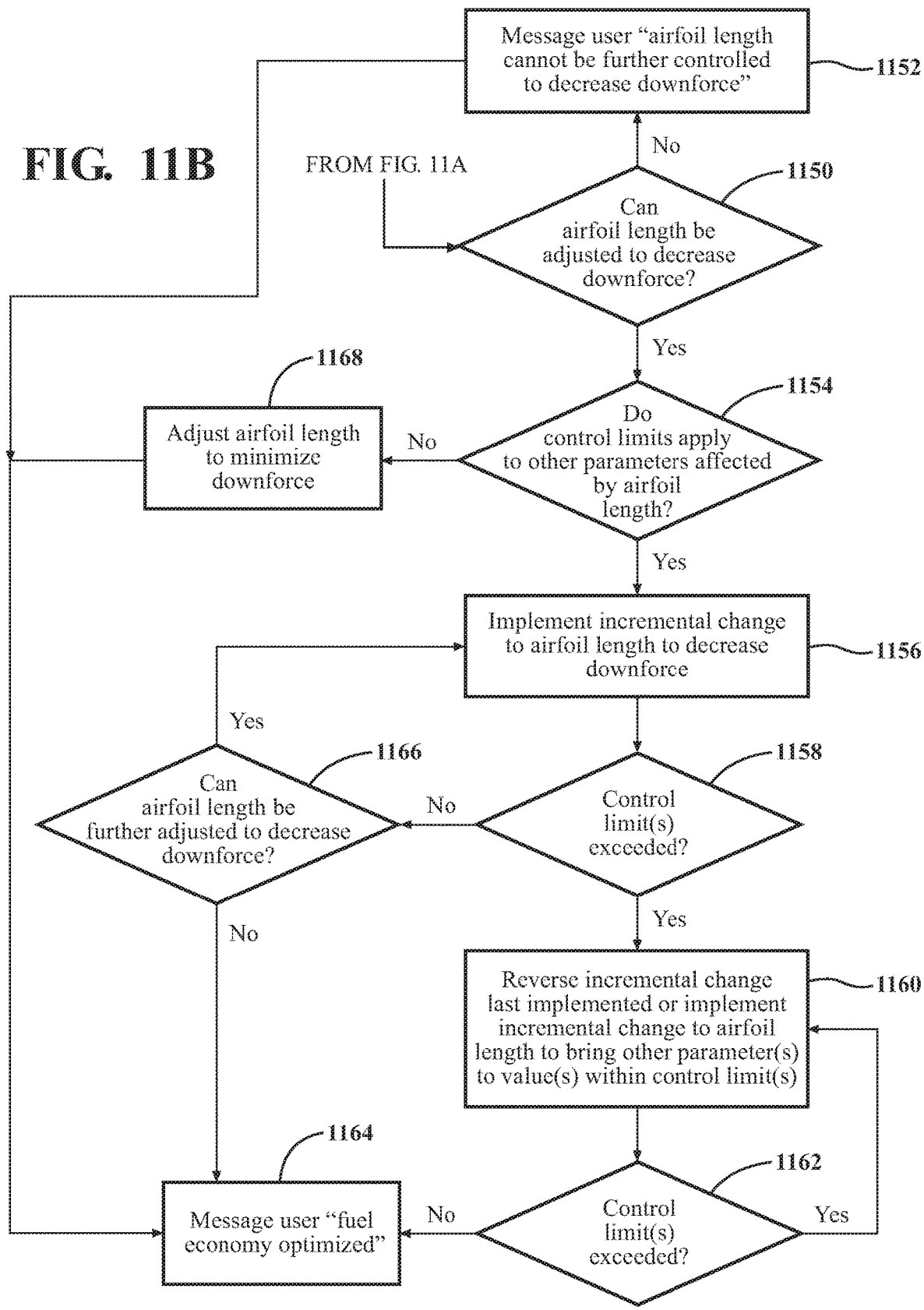

Referring now to FIGS. 4, 11A and 11B, in one or more arrangements, the airfoil control module 110 stored in memory 108 may be configured to control the configuration of the airfoil so as to optimize aspects of vehicle fuel economy which may be affected by the configuration of the airfoil 31. Thus, fuel economy may be the primary parameter sought to be affected by changing the airfoil configuration. The current vehicle fuel economy may be expressed in terms of any suitable parameters. In one or more arrangements, the fuel economy may be expressed in terms miles per gallon of fuel consumed by the vehicle. The fuel economy may be optimized by attempting to maximize the lift (or minimize the downforce) provided by the airfoil 31 in accordance with control limits (if any) applicable to road handling, which (as a secondary parameter) may also be affected by minimizing the downforce. Downforce may be minimized by modifying the airfoil angle to minimize the downward force exerted on the airfoil by an impinging airflow, and/or by minimizing the length of the airfoil to accordingly minimize the airfoil surface area on which the impinging airflow acts.

Additional aspects of controlling the airfoil configuration to optimize vehicle fuel economy will be discussed in relation to FIGS. 11A and 11B. FIGS. 11A and 11B illustrate a flowchart of a method 1130 that is associated with optimizing vehicle fuel economy. Method 1130 will be discussed from the perspective of the airfoil control system 102 of FIGS. 4 and 5. While method 1130 is discussed in combination with the airfoil control system 102, it should be appreciated that the method 1130 is not limited to being implemented within the airfoil control system 102, but is instead one example of a system that may implement the method 1130.

Referring to FIG. 11A, in block 1110, the control system 102 may receive from a user selection of a performance parameter to be optimized. In the example of FIGS. 11A and 11B, fuel economy has been selected for optimization. In block 1112, the control system 102 may determine if the airfoil angle can be adjusted to decrease downforce, with a view to optimizing fuel economy. For example, processor(s) 104 may determine the current angle of the airfoil and determine if the airfoil angle θ can be made negative (or more negative) as illustrated by configuration 30-2 of FIG. 7 to decrease downforce. The control system 102 may be configured to attempt to modify the airfoil angle θ before modifying the airfoil chord length CL, because changing the airfoil angle may be less complicated and energy-intensive. However, if desired, the control system 102 may be alternatively configured to attempt to modify the airfoil chord length CL before modifying the airfoil angle θ.

If the airfoil angle θ cannot be modified to decrease downforce, a message may be generated to the user (in bock 1111) that the airfoil angle cannot be further modified to decrease downforce. Then control may pass to block 1150, where it is determined if the airfoil length can be modified to decrease downforce.

However, if the airfoil angle θ can be modified to decrease downforce, processor(s) 104 may determine (in block 1114) if any control limits apply to any secondary parameters that would be affected by changing the airfoil angle. If no control limits apply, the airfoil angle may be controlled (in block 1126) to adjust the airfoil angle to provide minimum downforce. If control limits do apply to any secondary parameters that would affected by changing the airfoil angle θ, the control system 102 may (in block 1116) implement a predetermined incremental change to the airfoil angle directed to decreasing downforce. The incremental change to the angle θ may be specified by a user, or the incremental change may be pre-programmed into the control system 102. For example, the incremental change to the angle θ may be 1°, 2°, or any other value.

After implementing the incremental change, the processor(s) 104 may determine (in block 1118) if any applicable control limits were exceeded by the previously executed incremental change. If no control limits were exceeded, control may pass to block 1117, where the system determines if the airfoil angle can be further adjusted to decrease downforce. If the airfoil angle cannot be further adjusted to decrease downforce, control may pass to block 1150 (FIG. 11B), where it will be determined if the airfoil length can be adjusted to decrease downforce.

If the airfoil angle can be further adjusted to decrease downforce, control may pass back to block 1116, where another incremental change in angle may be implemented. However, if control limits were exceeded, control may pass to block 1120 where the previously executed incremental change may be reversed or the airfoil angle may be otherwise controlled in a manner designed to bring the secondary parameter(s) back within the applicable control limit(s).

Processor(s) 104 may then verify (in block 1122) that the control limits are no longer exceeded. If the control limits are still exceeded, control may pass back to block 1120 where the airfoil angle will be further controlled until the control limits are no longer exceeded. When the control limits are no longer exceeded, the downforce may be considered to have been optimized by changing the airfoil angle without the need to change the airfoil length.

Referring now to FIG. 11B, if it is not possible to further change the airfoil angle to decrease downforce, the control system 102 may determine (in block 1150) if the airfoil length can be adjusted to decrease the downforce. For example, if the airfoil angle is negative, it may be possible to decrease the length of the airfoil to decrease the surface area being affected by the moving airflow, thereby increasing the upward force acting on the airfoil 31.

If the airfoil length cannot be adjusted to decrease the downforce, the control system 102 may (in block 1152) message the user that the airfoil length cannot be further controlled to decrease downforce. The control system 102 may then (in block 1164) message the user that the airfoil configuration is optimized for fuel economy, since the adjustable parameters of the airfoil can me modified no further to decrease downforce. However, if the airfoil length can be adjusted to decrease the downforce, processor(s) 104 may determine (in block 1154) if any control limits apply to any secondary parameters that would be affected by changing the airfoil angle. If no control limits apply, the airfoil length may be controlled (in block 1168) to adjust the airfoil length to provide minimum downforce. If control limits do apply to any secondary parameters that would affected by changing the airfoil length, the control system 102 may implement a predetermined incremental change to the airfoil length directed to decreasing downforce. The incremental change to the length may be specified by a user, or the incremental change may be pre-programmed into the control system 102. For example, the incremental change to the length may be 2 inches, 5 inches, or any other value depending on the particular airfoil design and airfoil control system capabilities.

After implementing the incremental length change, the processor(s) 104 may determine (in block 1158) if any applicable control limits were exceeded by the previously executed incremental change. If no control limits were exceeded, control may pass to block 1166, where the system determines if the airfoil length can be further adjusted to decrease downforce. If the airfoil angle cannot be further adjusted to decrease downforce, control may pass to block 1164, where the user may be messaged that the fuel economy is optimized.

If the airfoil angle can be further adjusted to decrease downforce, control may pass back to block 1156, where another incremental change in length may be implemented. However, if control limits were exceeded, control may pass to block 1160 where the previously executed incremental length change may be reversed or the airfoil length may be otherwise controlled in a manner designed to bring the secondary parameter(s) back within the applicable control limit(s).

Processor(s) 104 may then (in block 1162) verify that the control limits are no longer exceeded. If the control limits are still exceeded, control may pass back to block 1160 where the airfoil length will be further controlled until the control limits are no longer exceeded. When the control limits are no longer exceeded, the fuel economy may be considered to have been optimized by changing the airfoil angle and/or the airfoil length.

While the embodiment of the airfoil control system 102 (including airfoil control module 110) described herein is configured for autonomously controlling a ground vehicle airfoil to optimize certain ground vehicle performance parameters, it will be understood that the airfoil control module may alternatively be configured to autonomously control an airfoil configured as described herein and installed on an aircraft or a submersible vehicle. For example, the configuration of an airfoil mounted on an aircraft may be manually or autonomously controlled in a manner as previously described to increase or decrease lift and to enhance either relatively lower-speed or relatively higher-speed flight characteristics of the airfoil. In another example, the configuration of an airfoil mounted on a submersible vehicle (such as a submarine) may be manually or autonomously controlled in a manner as previously described to cause an attached vehicle to dive or surface (or to aid the vehicle in diving or surfacing).

Similarly, while autonomous control of the airfoil configuration as described with reference to FIG. 5 may be exercised responsive to inputs from various vehicle-mounted and other road-related sensors external to the airfoil, autonomous control of the airfoil configuration in an aircraft or a submersible vehicle may be exercised responsive to inputs from environmental or other sensors external to the airfoil and configured to detect or measure aspects of the particular environment (e.g., airborne or water) in which the airfoil is being used. Autonomous control of the airfoil configuration may be responsive to inputs from suitable sensors based on pre-selected user preferences, as previously described, or on other criteria, depending on the particular airfoil application. Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11B, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A morphing airfoil system comprising:
an airfoil including a bulkhead structured to form a leading edge of the airfoil;
a first spool rotatably coupled to the bulkhead;
a second spool rotatably coupled to the bulkhead opposite the first spool; and
an airfoil skin having a first end secured to the first spool, a second end secured to the second spool, and a portion extending between the first and second spools to form an exterior surface of the airfoil,
the airfoil skin being structured to be windable around the first and second spools such that a configuration of the airfoil is controllable by rotating at least one of the first spool and the second spool so as to wind a portion of the airfoil skin around, or unwind a portion of the airfoil skin from, the at least one of the first spool and the second spool,
wherein the portion of the airfoil skin extending between the first and second spools forms an airfoil body defining a cavity, wherein the airfoil system further comprises at least one inflatable/deflatable bladder positioned within the cavity, and wherein the configuration of the airfoil is further controllable by increasing or decreasing pressure in the at least one inflatable/deflatable bladder in conjunction with winding a portion of the airfoil skin around, or unwinding a portion of the airfoil skin from, the at least one of the first spool and the second spool.

2. The morphing airfoil system of claim 1 wherein an angle of the airfoil is controllable by rotating one of the first spool and the second spool so as to wind a first portion of the airfoil skin around the one of the first spool and the second spool so as to shorten a portion of the airfoil skin extending between a trailing edge of the airfoil and the one of the first spool and the second spool, and simultaneously rotating the other one of the first spool and the second spool so as to unwind a second portion of the airfoil skin from the other one of the first spool and the second spool so as to lengthen a portion of the airfoil skin extending between the trailing edge of the airfoil and the other one of the first spool and the second spool.

3. The morphing airfoil system of claim 1 further comprising a plurality of individually inflatable/deflatable bladders positioned within the cavity and wherein the configuration of the airfoil is further controllable by selectively increasing and/or decreasing pressure in one or more inflatable/deflatable bladders of the plurality of individually inflatable/deflatable bladders in conjunction with winding a portion of the airfoil skin around, or unwinding a portion of the airfoil skin from, at least one of the first spool and the second spool.

4. The morphing airfoil system of claim 1 wherein a chord length of the airfoil is controllable by increasing pressure in the at least one inflatable/deflatable bladder so as to expand the at least one inflatable/deflatable bladder, in conjunction with simultaneously unwinding a first portion of the airfoil skin from the first spool so as to increase a length of the airfoil skin extending between a trailing edge of the airfoil and the first spool, and unwinding a second portion of the airfoil skin from the second spool so as to increase a length of the airfoil skin extending between the trailing edge of the airfoil and the second spool.

5. The morphing airfoil system of claim 1 wherein a chord length of the airfoil is controllable by decreasing pressure in the at least one inflatable/deflatable bladder so as to contract or enable contraction the at least one inflatable/deflatable bladder, in conjunction with simultaneously winding a first portion of the airfoil skin around the first spool so as to decrease a length of the airfoil skin extending between a trailing edge of the airfoil and the first spool, and winding a second portion of the airfoil skin around the second spool so as to decrease a length of the airfoil skin extending between the trailing edge of the airfoil and the second spool.

6. The morphing airfoil system of claim 1 wherein a thickness of at least a portion of the airfoil is controllable by increasing pressure the at least one inflatable/deflatable bladder so as to expand the at least one inflatable/deflatable bladder, in conjunction with simultaneously unwinding a first portion of the airfoil skin from the first spool so as to increase a length of the airfoil skin extending between a trailing edge of the airfoil and the first spool, and unwinding a second portion of the airfoil skin from the second spool so as to increase a length of the airfoil skin extending between the trailing edge of the airfoil and the second spool.

7. The morphing airfoil system of claim 1 wherein a thickness of the airfoil is controllable by decreasing pressure in the at least one inflatable/deflatable bladder so as to contract or enable contraction the at least one inflatable/deflatable bladder, in conjunction with simultaneously winding a first portion of the airfoil skin around the first spool so as to decrease a length of the airfoil skin extending between a trailing edge of the airfoil and the first spool, and winding a second portion of the airfoil skin around the second spool so as to decrease a length of the airfoil skin extending between the trailing edge of the airfoil and the second spool.

8. The morphing airfoil system of claim 1 further comprising at least one roller assembly attached to the at least one inflatable/deflatable bladder, the at least one roller assembly including at least one roller positioned between the at least one inflatable/deflatable bladder and the airfoil skin and in contact with the airfoil skin, to facilitate relative movement between the at least one inflatable/deflatable bladder and the airfoil skin.

9. The morphing airfoil system of claim 1 further comprising a turbine blade rotatably coupled to the bulkhead to provide wind power for operation of components of the morphing airfoil system.

10. The morphing airfoil system of claim 1 further comprising a battery positioned within the bulkhead, and a solar panel operably coupled to the battery so as to enable charging of the battery.

* * * * *